US011089518B2

(12) United States Patent
Damnjanovic et al.

(10) Patent No.: US 11,089,518 B2
(45) Date of Patent: Aug. 10, 2021

(54) INTERTECHNOLOGY MEDIUM SHARING FOR MILLIMETER WAVE

(71) Applicant: QUALCOMM Incorporated, San Diego, CA (US)

(72) Inventors: Aleksandar Damnjanovic, Del Mar, CA (US); Xiaoxia Zhang, San Diego, CA (US); Arumugam Chendamarai Kannan, San Diego, CA (US); Jing Sun, San Diego, CA (US); Yongbin Wei, La Jolla, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/534,781

(22) Filed: Aug. 7, 2019

(65) Prior Publication Data
US 2020/0053599 A1 Feb. 13, 2020

Related U.S. Application Data

(60) Provisional application No. 62/717,388, filed on Aug. 10, 2018.

(51) Int. Cl.
*H04L 12/28* (2006.01)
*H04W 28/26* (2009.01)
(Continued)

(52) U.S. Cl.
CPC ......... *H04W 28/26* (2013.01); *H04L 27/0006* (2013.01); *H04L 27/2666* (2013.01); *H04W 16/14* (2013.01); *H04W 74/0816* (2013.01)

(58) Field of Classification Search
CPC ............... H04L 5/0073; H04L 27/2602; H04L 27/0006; H04W 16/14; H04W 28/26
(Continued)

(56) References Cited

U.S. PATENT DOCUMENTS 5,732,076 A * 3/1998 Ketseoglou .......... H04B 7/2656
370/347
2005/0276241 A1* 12/2005 Kamerman ........... H04W 28/06
370/328
(Continued)

OTHER PUBLICATIONS

International Search Report and Written Opinion—PCT/US2019/045745—ISA/EPO—dated Oct. 23, 2019.

*Primary Examiner* — John Pezzlo
(74) *Attorney, Agent, or Firm* — Liem T. Do

(57) ABSTRACT

Methods, systems, and devices for wireless communications are described. The method includes receiving a transmission from a first wireless device at a second wireless device, the transmission including a first coexistence preamble configured to reserve a channel of a shared radio frequency band for a first period of time, a first segment, and a second segment, where the first coexistence preamble comprises an initial channel reservation sequence and a data field indicating information about the first period of time; and transmitting, during a gap period between the first segment and the second segment, a receiver protection signal from the second wireless device, the receiver protection signal including a second coexistence preamble configured to reserve the channel of the shared radio frequency band for a second period of time associated with the second transmission segment.

25 Claims, 17 Drawing Sheets

(51) Int. Cl.
   *H04W 74/08*   (2009.01)
   *H04L 27/26*   (2006.01)
   *H04L 27/00*   (2006.01)
   *H04W 16/14*   (2009.01)
   *H04J 1/16*    (2006.01)

(58) Field of Classification Search
   USPC ........ 270/252, 329, 386, 442; 370/252, 329, 370/386, 442
   See application file for complete search history.

(56) References Cited

U.S. PATENT DOCUMENTS

| | | |
|---|---|---|
| 2016/0057770 A1 | 2/2016 | Yerramalli et al. |
| 2016/0248555 A1 | 8/2016 | Lei et al. |
| 2017/0142592 A1* | 5/2017 | Fischer ............. H04W 72/1263 |
| 2018/0139777 A1 | 5/2018 | Yoo et al. |

* cited by examiner

INTERTECHNOLOGY MEDIUM SHARING FOR MILLIMETER WAVE

CROSS REFERENCE

The present Application for Patent claims the benefit of U.S. Provisional Patent Application No. 62/717,388 by Damnjanovic, et al., entitled "INTERTECHNOLOGY MEDIUM SHARING FOR MILLIMETER WAVE," filed Aug. 10, 2018, assigned to the assignee hereof, and expressly incorporated herein.

BACKGROUND

The following relates generally to wireless communications, and more specifically to intertechnology medium sharing for millimeter wave.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may be configured to operate over a shared radio frequency band. In some cases, channel sensing procedures to access such a band may vary across different types of wireless technology, and may provide protection mainly for a transmitting device, with little or no protection for a receiving device. Therefore, improved channel sensing techniques for accessing shared radio frequency band may be desirable.

SUMMARY

The described techniques relate to improved methods, systems, devices, and apparatuses that support intertechnology medium sharing for millimeter wave. Generally, the described techniques provide for intertechnology medium sharing for shared radio frequency spectrum bands, such as millimeter wave bands. Specifically, the following relates to channel sensing procedures using a common signaling waveform employed and understood by devices of different radio access technologies (RATs) operating in the same shared radio frequency spectrum bands.

A method of wireless communication is described. The method may include generating, by a first wireless device, a first coexistence preamble configured to reserve a channel of a shared radio frequency band for a first period of time, where the first coexistence preamble includes an initial channel reservation sequence and a data field indicating information about the first period of time, performing a transmission to a second wireless device during the first period of time, where the transmission includes at least the first coexistence preamble, a first segment and a second segment, and receiving, during a gap period between the first segment and the second segment, a receiver protection signal from the second wireless device, the receiver protection signal including a second coexistence preamble configured to reserve the channel of the shared radio frequency band for a second period of time associated with the second transmission segment.

An apparatus for wireless communication is described. The apparatus may include a processor, memory in electronic communication with the processor, and instructions stored in the memory. The instructions may be executable by the processor to cause the apparatus to generate a first coexistence preamble configured to reserve a channel of a shared radio frequency band for a first period of time, where the first coexistence preamble includes an initial channel reservation sequence and a data field indicating information about the first period of time, perform a transmission to a wireless device during the first period of time, where the transmission includes at least the first coexistence preamble, a first segment and a second segment, and receive, during a gap period between the first segment and the second segment, a receiver protection signal from the wireless device, the receiver protection signal including a second coexistence preamble configured to reserve the channel of the shared radio frequency band for a second period of time associated with the second transmission segment.

Another apparatus for wireless communication is described. The apparatus may include means for generating a first coexistence preamble configured to reserve a channel of a shared radio frequency band for a first period of time, where the first coexistence preamble includes an initial channel reservation sequence and a data field indicating information about the first period of time, performing a transmission to a wireless device during the first period of time, where the transmission includes at least the first coexistence preamble, a first segment and a second segment, and receiving, during a gap period between the first segment and the second segment, a receiver protection signal from the wireless device, the receiver protection signal including a second coexistence preamble configured to reserve the channel of the shared radio frequency band for a second period of time associated with the second transmission segment.

A non-transitory computer-readable medium storing code for wireless communication is described. The code may include instructions executable by a processor to generate a first coexistence preamble configured to reserve a channel of a shared radio frequency band for a first period of time, where the first coexistence preamble includes an initial channel reservation sequence and a data field indicating information about the first period of time, perform a transmission to a wireless device during the first period of time, where the transmission includes at least the first coexistence preamble, a first segment and a second segment, and receive, during a gap period between the first segment and the second segment, a receiver protection signal from the wireless device, the receiver protection signal including a second coexistence preamble configured to reserve the channel of the shared radio frequency band for a second period of time associated with the second transmission segment.

Some examples of the method, apparatuses, and non-transitory computer-readable medium described herein may further include operations, features, means, or instructions for receiving with the receiver protection signal one or more of: an acknowledgment message from a wireless device for the first segment, a negative acknowledgment message from the wireless device for the first segment, or a control channel transmission from the wireless device.

Some examples of the method, apparatuses, and non-transitory computer-readable medium described herein may further include operations, features, means, or instructions for generating the data field of the first coexistence preamble by modulating a phase of a Golay sequence based on the information about the first period of time. Some examples of the method, apparatuses, and non-transitory computer-readable medium described herein may further include operations, features, means, or instructions for performing a beam sweep during at least a portion of the transmission.

Some examples of the method, apparatuses, and non-transitory computer-readable medium described herein may further include operations, features, means, or instructions for prepending the first coexistence preamble to a short training field (STF) of a WLAN frame. Some examples of the method, apparatuses, and non-transitory computer-readable medium described herein may further include operations, features, means, or instructions for puncturing a short training field (STF) of a WLAN frame with the first coexistence preamble.

Some examples of the method, apparatuses, and non-transitory computer-readable medium described herein may further include operations, features, means, or instructions for transmitting the first coexistence preamble a fixed distance following a short training field (STF) of a WLAN frame. Some examples of the method, apparatuses, and non-transitory computer-readable medium described herein may further include operations, features, means, or instructions for transmitting a padding signal between an end of the STF of the WLAN frame and a beginning of the first coexistence preamble. In some examples of the method, apparatuses, and non-transitory computer-readable medium described herein, performing the transmission may include operations, features, means, or instructions for transmitting a set of coexistence preambles during the first period of time.

A method of wireless communication is described. The method may include receiving a transmission from a first wireless device at a second wireless device, the transmission including a first coexistence preamble configured to reserve a channel of a shared radio frequency band for a first period time, a first segment, and a second segment, where the first coexistence preamble includes an initial channel reservation sequence and a data field indicating information about the first period of time and transmitting, during a gap period between the first segment and the second segment, a receiver protection signal from the second wireless device, the receiver protection signal including a second coexistence preamble configured to reserve the channel of the shared radio frequency band for a second period of time associated with the second transmission segment.

An apparatus for wireless communication is described. The apparatus may include a processor, memory in electronic communication with the processor, and instructions stored in the memory. The instructions may be executable by the processor to cause the apparatus to receive a transmission from a wireless device, the transmission including a first coexistence preamble configured to reserve a channel of a shared radio frequency band for a first period time, a first segment, and a second segment, where the first coexistence preamble includes an initial channel reservation sequence and a data field indicating information about the first period of time and transmit, during a gap period between the first segment and the second segment, a receiver protection signal from the apparatus, the receiver protection signal including a second coexistence preamble configured to reserve the channel of the shared radio frequency band for a second period of time associated with the second transmission segment.

Another apparatus for wireless communication is described. The apparatus may include means for receiving a transmission from a wireless device at the apparatus, the transmission including a first coexistence preamble configured to reserve a channel of a shared radio frequency band for a first period time, a first segment, and a second segment, where the first coexistence preamble includes an initial channel reservation sequence and a data field indicating information about the first period of time and transmitting, during a gap period between the first segment and the second segment, a receiver protection signal from the apparatus, the receiver protection signal including a second coexistence preamble configured to reserve the channel of the shared radio frequency band for a second period of time associated with the second transmission segment.

A non-transitory computer-readable medium storing code for wireless communication is described. The code may include instructions executable by a processor to receive a transmission from a wireless device, the transmission including a first coexistence preamble configured to reserve a channel of a shared radio frequency band for a first period time, a first segment, and a second segment, where the first coexistence preamble includes an initial channel reservation sequence and a data field indicating information about the first period of time and transmit, during a gap period between the first segment and the second segment, a receiver protection signal via the processor, the receiver protection signal including a second coexistence preamble configured to reserve the channel of the shared radio frequency band for a second period of time associated with the second transmission segment.

Some examples of the method, apparatuses, and non-transitory computer-readable medium described herein may further include operations, features, means, or instructions for transmitting in connection with the receiver protection signal one or more of: an acknowledgment message from a wireless device for the first segment, a negative acknowledgment message from the wireless device for the first segment, or a control channel transmission from the wireless device.

Some examples of the method, apparatuses, and non-transitory computer-readable medium described herein may further include operations, features, means, or instructions for demodulating a phase of a Golay sequence to obtain the information about the first period of time. Some examples of the method, apparatuses, and non-transitory computer-readable medium described herein may further include operations, features, means, or instructions for receiving the first coexistence preamble a fixed distance following a short training field (STF) of a WLAN frame.

Some examples of the method, apparatuses, and non-transitory computer-readable medium described herein may further include operations, features, means, or instructions for receiving a padding signal between an end of the STF of the WLAN frame and a beginning of the first coexistence preamble. In some examples of the method, apparatuses, and non-transitory computer-readable medium described herein, receiving the transmission may include operations, features, means, or instructions for receiving a set of coexistence preambles during the first period of time.

A method of wireless communications is described. The method may include monitoring a channel of a shared radio frequency band as part of a channel sensing procedure, receiving, based on the monitoring, a coexistence preamble configured to reserve the channel for a first period of time, where the first coexistence preamble includes an initial channel reservation sequence and a data field indicating information about the first period of time, and backing off from transmitting on the channel for at least the first period of time based on the received coexistence preamble.

An apparatus for wireless communications is described. The apparatus may include a processor, memory in electronic communication with the processor, and instructions stored in the memory. The instructions may be executable by the processor to cause the apparatus to monitor a channel of a shared radio frequency band as part of a channel sensing procedure, receive, based on the monitoring, a coexistence preamble configured to reserve the channel for a first period of time, where the first coexistence preamble includes an initial channel reservation sequence and a data field indicating information about the first period of time, and back off from transmitting on the channel for at least the first period of time based on the received coexistence preamble.

Another apparatus for wireless communications is described. The apparatus may include means for monitoring a channel of a shared radio frequency band as part of a channel sensing procedure, receiving, based on the monitoring, a coexistence preamble configured to reserve the channel for a first period of time, where the first coexistence preamble includes an initial channel reservation sequence and a data field indicating information about the first period of time, and backing off from transmitting on the channel for at least the first period of time based on the received coexistence preamble.

A non-transitory computer-readable medium storing code for wireless communications is described. The code may include instructions executable by a processor to monitor a channel of a shared radio frequency band as part of a channel sensing procedure, receive, based on the monitoring, a coexistence preamble configured to reserve the channel for a first period of time, where the first coexistence preamble includes an initial channel reservation sequence and a data field indicating information about the first period of time, and back off from transmitting on the channel for at least the first period of time based on the received coexistence preamble.

DETAILED DESCRIPTION

The following relates to intertechnology medium sharing for shared radio frequency spectrum bands, such as millimeter wave bands. Specifically, the following relates to channel sensing procedures (e.g., Listen-before Talk (LBT) procedures) using a common signaling waveform employed and understood by devices of different radio access technologies (RATs) operating in the same shared radio frequency spectrum bands. The common signaling waveform may be included in a coexistence preamble to reserve a wireless channel of a shared radio frequency spectrum and indicate an occupancy time to other devices operating on the channel. Upon receiving the coexistence preamble, other devices operating on the channel may back off from accessing the channel until after the occupancy time signaled by the coexistence preamble has expired.

The coexistence preamble may include an initial channel reservation sequence, such as a Golay or similar sequence, followed by a data field indicating information about the amount of time for which the channel is being reserved. In some examples, the coexistence preamble may also include a request for omnidirectional medium sensing by other devices operating on the channel.

In some examples, a transmitting device may transmit the coexistence preamble immediately prior to a transmission (e.g., a downlink transmission or uplink transmission) sent to a receiving device. The coexistence preamble may reserve the wireless channel for the amount of time used to perform the transmission. In some cases, the transmission may be divided into multiple segments, and the receiving device may transmit one or more periodic receiver protection signals on the wireless channel during one or more gap periods between segments of the transmission. The receiver protection signal may include a version of the coexistence preamble transmitted from the transmitting device, and the receiver protection signal may reserve the channel for a period of time associated with an upcoming segment of the transmission.

Aspects of the disclosure are initially described in the context of a wireless communications system. The present techniques include examples of a transmit opportunity (TXOP) and examples of a common waveform design that support intertechnology medium sharing for millimeter wave in accordance with aspects of the present disclosure. Aspects of the disclosure are further illustrated by and described with reference to apparatus diagrams, system diagrams, and flowcharts that relate to intertechnology medium sharing for millimeter wave.

Figure 1:
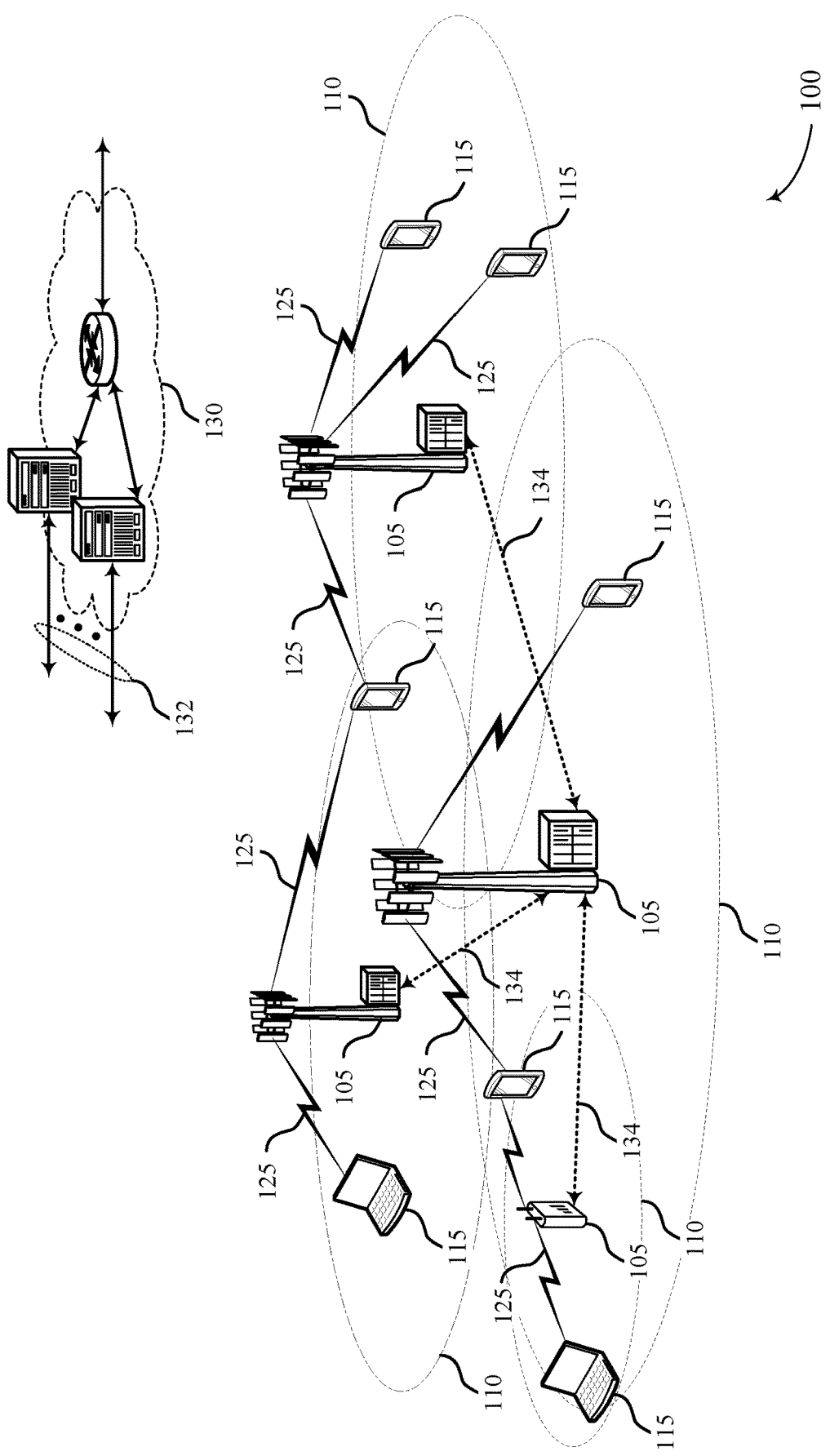
FIG. 1 illustrates an example of a system for wireless communications that supports intertechnology medium sharing for millimeter wave in accordance with aspects of the present disclosure.

FIG. 1 illustrates an example of a wireless communications system 100 that supports intertechnology medium sharing for millimeter wave in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ channel sensing procedures (e.g., listen-before-talk (LBT) procedures) to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the wireless communications system 100 may include a wireless local area network (WLAN) (also known as a Wi-Fi network) configured in accordance with various aspects of the present disclosure. The WLAN may include an access point (AP) and multiple associated stations, which may represent devices such as mobile stations, personal digital assistant (PDAs), other handheld devices, netbooks, notebook computers, tablet computers, laptops, display devices (e.g., TVs, computer monitors, etc.), printers, etc. The AP and the associated stations may represent a basic service set (BSS) and/or extended service set (ESS). The various stations in the network are able to communicate with one another through the AP. Also shown is a coverage area of the AP, which may represent a BSA of the WLAN. An extended network station (not shown) associated with the WLAN may be connected to a wired or wireless distribution system that may allow multiple APs to be connected in an ESS.

Although not shown in FIG. 1, a station may be located in the intersection of more than one coverage area and may associate with more than one AP. A single AP and an associated set of stations may be referred to as a BSS. An ESS may be a set of connected BSSs. A distribution system (not shown) may be used to connect APs in an ESS. In some cases, the coverage area of an AP may be divided into sectors (also not shown). The WLAN may include APs of different types (e.g., metropolitan area, home network, etc.), with varying and overlapping coverage areas. Two stations may also communicate directly via a direct wireless link regardless of whether both stations are in the same coverage area. Examples of direct wireless links may include Wi-Fi Direct connections, Wi-Fi Tunneled Direct Link Setup (TDLS) links, and other group connections stations and APs may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN.

In some cases, a station (or an AP) may be detectable by a central AP, but not by other stations in the coverage area of the central AP. For example, one station may be at one end of the coverage area of the central AP while another station may be at the other end. Thus, both stations may communicate with the AP, but may not receive the transmissions of the other. This may result in colliding transmissions for the two stations in a contention based environment (e.g., CSMA/CA) because the stations may not refrain from transmitting on top of each other. A station whose transmissions are not identifiable, but that is within the same coverage area may be known as a hidden node. CSMA/CA may be supplemented by the exchange of an RTS packet transmitted by a sending station (or AP) and a CTS packet transmitted by the receiving station (or AP). This may alert other devices within range of the sender and receiver not to transmit for the duration of the primary transmission. Thus, RTS/CTS may help mitigate a hidden node problem.

The present techniques enable medium protection for multi-technology such as NR cellular and/or WiFi devices sharing mechanism for shared radio frequency spectrum bands (e.g., in mmW bands), that results in the medium being protected from collisions, interference, etc.

One or more of the base stations 105 may include coexistence manager, which may enable the base stations 105 to perform a channel reservation technique (e.g., listen-before-talk (LBT) technique) using a common waveform embodied in a coexistence preamble. In one example, base stations 105, in conjunction with the coexistence manager, may generate a first coexistence preamble configured to reserve a channel of a shared radio frequency band for a first period of time. The coexistence preamble may be received and understood by devices using different radio access technologies (such as other base stations 105, UEs 115, WiFi devices, and other types of devices accessing the shared radio frequency spectrum band), and these other devices may back off from accessing the channel for the first period of time based on receiving the coexistence preamble. The coexistence preamble may include an initial channel reservation sequence, such as a Golay sequence, followed by a data field indicating information about the amount of time for which the channel is being reserved. The coexistence preamble may optionally include a request for omni-directional sensing in channel sensing procedures (e.g., LBT procedures) performed by other devices operating on the channel. In some examples, base stations 105, in conjunction with the coexistence manager, may perform a downlink transmission to a UE (e.g., UEs 115) during the first period of time, and receive, during a gap period between the first segment (e.g., first downlink segment) and the second segment (e.g., second downlink segment), a receiver protection signal from the UE that includes a second coexistence preamble configured to reserve the channel of the shared radio frequency band for a second period of time associated with the second transmission segment.

In some cases, UEs 115 may include a coexistence manager, which may enable UEs 115 to protect a medium for multi-technology. In one example, UEs 115, in conjunction with the coexistence manager, may receive a downlink transmission from a base station (e.g., base stations 105). In some cases, UEs 115 may transmit, during a gap period between the first segment and the second segment, a receiver protection signal that includes a second coexistence preamble configured to reserve the channel of the shared radio frequency band for a second period of time associated with the second transmission segment.

Based on the present techniques, devices associated with different technologies (e.g., cellular devices, NR devices, WLAN devices, other devices, etc.) all operate according to the principles described herein to enable fair access to the medium and efficient medium sharing between the different technologies.

Figure 2:
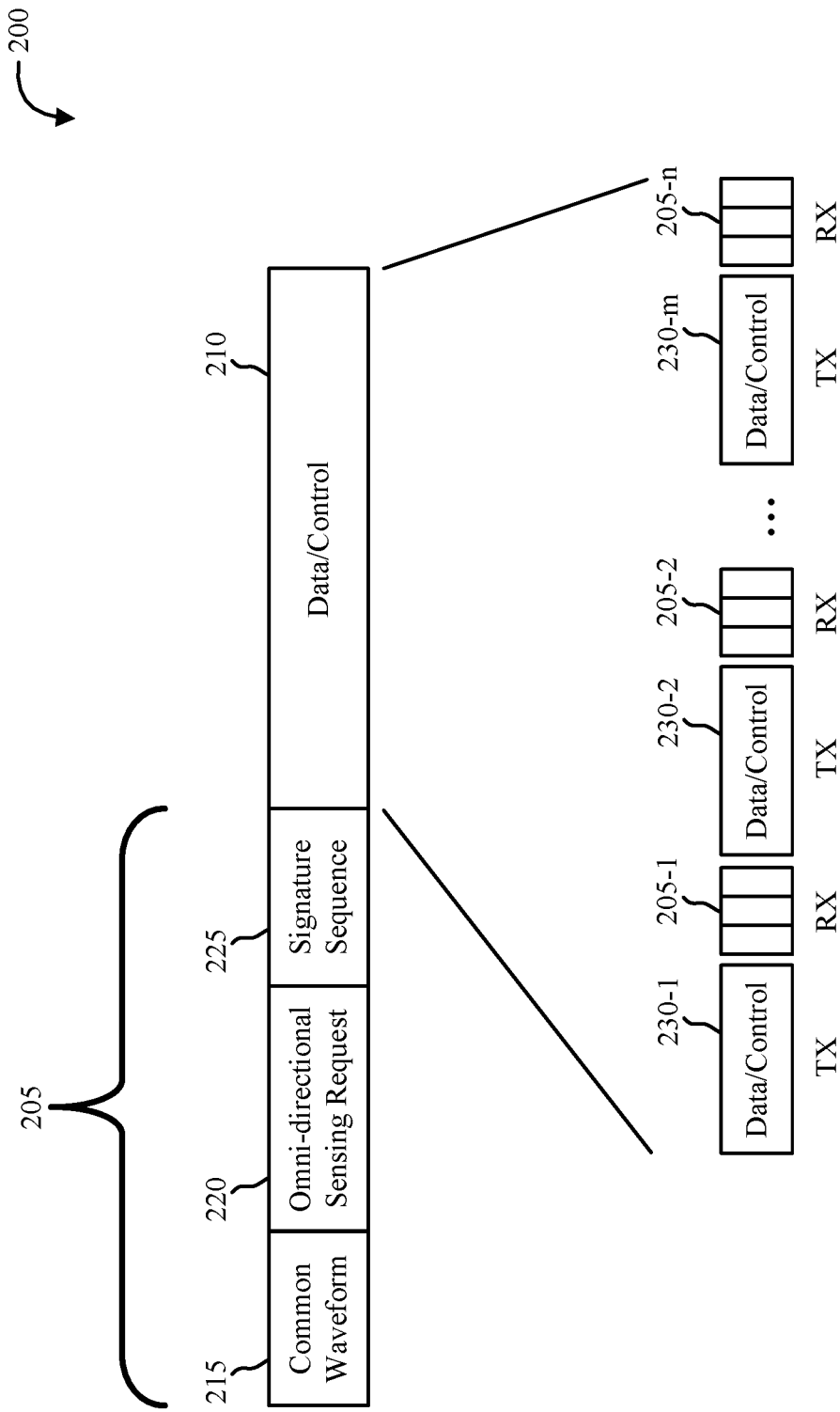
FIG. 2 illustrates an example of a transmit opportunity (TXOP) that supports intertechnology medium sharing for millimeter wave in accordance with aspects of the present disclosure.

FIG. 2 illustrates an example of a transmit opportunity (TXOP) 200 that supports intertechnology medium sharing for millimeter wave in accordance with aspects of the present disclosure. In some examples, TXOP 200 may implement aspects of wireless communication system 100.

In one example, the TXOP 200 may be used in a channel sensing medium reservation (e.g., LBT medium reservation) and/or receiver protection procedure (e.g., omni-directional receiver protection and/or directional receiver protection).

As shown, the TXOP 200 may include a coexistence preamble 205 and a data/control transmission 210. In one example, the coexistence preamble 205 may include a common waveform 215, an omni-directional sensing request 220, and a signature sequence 225. One example of common waveform 215 may include one or more sequences (e.g., one or more Golay sequences). In some examples, the omni-directional sensing request 220 may be optional in the coexistence preamble 205. For example, the coexistence preamble 205 may include the common waveform 215 and the signature sequence 225, but not the omni-directional sensing request 220.

In one example, the coexistence preamble 205 may be transmitted between a transmitting device and a receiving device. In some cases, the transmitting device may send the coexistence preamble 205 to the receiving device before sending data transmission (e.g., data/control transmission 210). Additionally or alternatively, the receiving device may send the coexistence preamble 205 before sending control signaling or feedback to the transmitting device (e.g., data/control transmission 210). Examples of control signaling or feedback may include at least one of an acknowledgement (ACK) message, a negative acknowledgement (NACK) message, other Hybrid Automatic-Repeat-Request (HARQ) feedback, physical uplink control channel (PUCCH) transmissions, etc. It is noted that reference to "transmitter" may refer to the transmitter of a transmitting device or a transmitter of a receiving device. Similarly, reference to "receiver" may refer to the receiver of a transmitting device or a receiver of a receiving device.

In one example, the receiving device may send the coexistence preamble 205 without sending control signaling and/or feedback to the transmitting device. In some cases, the receiving device may send periodic receiver protection signals (e.g., coexistence preamble 205) during a TXOP reserved by the transmitting device so that the receiving device may use the channel to receive transmissions from the transmitting device without interference.

In some cases, the periodicity (T) of the coexistence waveform within a frame may dictate a dwell time. The dwell time may include the amount of time a device must occupy/transmit on a channel once the channel has been reserved. In some examples, a potential transmitter listens to the medium at least for time duration T and only when it does not detect any coexistence waveform or energy above a predetermined threshold beyond the time duration T, can the transmitter access the medium. In some cases, the predetermined threshold may differ for data and control channels (e.g., a first energy threshold for data transmission and a second energy threshold for control channels, where the second energy threshold may be different from the first energy threshold). In some cases, the coexistence waveform from the receiver may be sent (e.g., in WiFi) along with an acknowledgment (ACK), a negative acknowledgment (NACK), block ACK, and/or may be sent along with physical uplink control channel (PUCCH) in shared radio frequency spectrum band. Examples of the shared radio frequency spectrum band may include unlicensed radio frequency spectrum band such as New Radio Unlicensed (NR-U). In some cases, a periodicity of the ACK/NACK feedback may be tied to the dwell time.

In some examples, a transmitting device or receiving device may transmit coexistence preamble 205 or at least one of common waveform 215, omni-directional sensing request 220, or signature sequence 225, or any combination thereof, instead of transmitting a network allocation vector (NAV). Compared with the present techniques, transmitting a NAV may be comparatively complicated because a relatively large number of sequences would have to be used in a conventional process of inter-technology coexistence since the conventional process would decode the message using convolution or some other more complicated code. In contrast, the present techniques may use one or more signature sequences 225 to limit the number of bits sent in the coexistence preamble 205. In some cases, whenever transmission direction changes between two devices (e.g., between a transmitting device and a receiving device), there may be no break or pause, so no other device (e.g., no other device other than a particular transmitting device and receiving device) may be allowed to reserve the medium.

In one example, a receiving device may identify how long a transmission duration is or will be because the receiving device receives a coexistence preamble 205 from a transmitting device and the coexistence preamble 205 from the transmitting device indicates how long the transmission duration is. Accordingly, the receiving device may also protect the same medium for a fixed amount of time to send control and/or feedback information to the transmitting device and, in some cases, may continue doing so between the data transmissions of the transmitting device.

In one example, the common waveform 215 may be sent after a Short Training Field (STF) or as part of the STF. In some cases, a receiver of a transmitting device or receiving device may do omni-directional sensing of the STF. When the receiver detects the presence of the coexistence preamble 205, then the receiver may either continue decoding a message omni-directionally (e.g., based on omni-directional sensing) and decoding another message directionally (e.g., based on directional sensing); or the receiver may decode a message based only on directional sensing. However, in some cases, the receiver may be configured to change the receiver beam. When a transmitter senses a medium, the transmitter may not know which direction the coexistence preamble 205 is or will come from, so at least the common waveform 215 may be sent omni-directionally. However, once the transmitter detects the presence of a signal, the transmitter may be configured to decode a message omni-directionally because the transmitter is configured to transmit omni-directionally based on information in omni-directional sensing request 220, or the transmitter may transmit directionally in a particular direction based on information in signature sequence 225.

In one embodiment, the coexistence preamble 205 may be sent in a particular sequence, with common waveform 215 sent first, followed by omni-directional sensing request 220 being sent after common waveform 215, followed by signature sequence 225 being sent after omni-directional sensing request 220. In some cases, a transmitter may send coexistence preamble 205 to indicate its presence in a medium. Additionally or alternatively, a receiver may send coexistence preamble 205 to indicate its presence in the medium, enabling the transmitting device or receiving device to reserve the medium for a specified duration.

In some cases, a transmitting device may begin a data transmission by broadcasting an instance of common waveform 215. Similarly, a receiving device may begin a control or feedback transmission by broadcasting an instance of common waveform 215. In one example, the common waveform 215 may be transmitted only omni-directionally. In some cases, whenever a transmission direction switches, an instance of coexistence preamble 205 may be sent, where the instance of the coexistence preamble 205 includes at least an instance of common waveform 215 and signature sequence 225, and optionally an instance of omni-directional sensing request 220 as well.

In one example, the coexistence preamble 205 may be relatively long with a relatively large number of data bits (e.g., 1 or 2 milliseconds or less to transmit end to end). For example, a transmitter may send coexistence preamble 205 and reserve the medium for a single transmission of data over TXOP 200 (e.g., data/control transmission 210). For example, when a transmitting device is configured to send a block of data, the transmitting device may reserve TXOP 200 for a single data transmission when the block of data is relatively short (e.g., when the block of data satisfies a data size threshold, when the block of data is below the data size threshold, etc.). In this case, coexistence preamble 205 may indicate that the block of data will be sent in a single transmission (e.g., data/control transmission 210).

In one example, the sequence of coexistence preamble 205 and data/control transmission 210 may be one TXOP for a transmitting device. In some cases, a transmitting device or receiving device may send coexistence preamble 205 to reserve the duration of the entire data/control transmission 210 sending a block of data in a single transmission. However, having a transmitting device or receiving device reserve the medium for an entire block of data may result in an increase of the number of bits having to be transmitted in the coexistence preamble 205. For example, the coexistence preamble 205 may be several milliseconds long to reserve the duration of a single transmission of an entire relatively large block of data. On the other hand, configuring the reserved duration times to be relatively short, where the transmitting device divides the entire block of data into multiple segments or chunks of data and sending each segment in a separate transmission, then the number of bits used in the coexistence preamble 205 may be minimized (e.g., 1-10 microseconds per coexistence preamble 205, or less).

In some cases, the data size threshold may be based at least in part on a maximum number of bits that may be transmitted in coexistence preamble 205. For example, as the number of bits in a data block configured for transmission by a transmitter increases, the more data bits must be used in coexistence preamble 205. In one example, a data block may be divided into multiple chunks of data and one or more chunks of data may be sent with an instance of coexistence preamble 205. For instance, coexistence preamble 205 may be sent as shown. Subsequently, a data or control transmission 230-1 may be sent over the medium reserved by coexistence preamble 205. For example, data or control transmission 230-1 may represent a transmitting device sending data to a receiving device, or may represent a receiving device sending control/feedback to a transmitting device. Subsequently, one or more additional instances of the coexistence preamble (e.g., coexistence preamble 205-1 to coexistence preamble 205-n) may be sent by the transmitting device and/or receiving device. Thus, either the transmitting device or the receiving device, or both, may continue to reserve the medium by broadcasting additional instances of the coexistence preamble. For example, following the broadcasting of coexistence preamble 205-1, data or control transmission 230-2 may be sent over the reserved medium, and so on.

As shown, a transmitting device and/or receiving device may transmit instances of coexistence preamble 205 each time a transmitting device sends data and/or each time a receiving device sends control information or feedback to the transmitting device. If a receiving device were to send control information or feedback without sending an instance of coexistence preamble 205, then one or more nodes that were not sensing at that time the first coexistence preamble 205 was sent for a given data transmission would not hear the subsequent transmissions. Thus, these nodes may be "deaf" to these subsequent transmissions, and as a result may begin to transmit, causing interference with the transmission of transmitting device and/or receiving device.

In one example, the omni-directional sensing request 220 may be used to provide omni-directional receiver protection. In some cases, a transmitting device or receiving device may send the omni-directional sensing request 220 to reserve a medium on which to transmit data/control transmission 210 omni-directionally, to protect the medium from collisions, interference, etc., caused, for example, by deaf nodes. In some cases, omni-directional sensing request 220 may be used to indicate incoming signaling. In some cases, omni-directional sensing request 220 may be used to indicate an interfering signal strength offset.

In some examples, the omni-directional sensing request 220 may be used to indicate which particular device (e.g., transmitting device or receiving device) is sending an instance of coexistence preamble 205 (e.g., via a node identifier such as a media access control (MAC) address, etc.). In some cases, the omni-directional sensing request 220 may be used to indicate beam sweeping for beam management (e.g., Synchronization Signal Block (SSB), Channel State Information-Reference Signals (CSI-RS)).

In some examples, the omni-directional sensing request 220 may be used for measurements and/or a search procedure among other purposes when a beam direction is unclear. In some examples, the omni-directional sensing request 220 may be limited to a relatively low duty cycle. For example, a signaling procedure associated with the present techniques may be limited to a relatively small number of bits. In some cases, transmitter signal indication may be combined with receiver protection of the control channel. In some cases, medium reservation may be used for data transmission and/or control reception. In some cases, the present techniques may be based at least in part on a random back off with a fixed window contention window size.

In some examples, the omni-directional sensing request 220 may be optional in an instance of coexistence preamble 205. For example, one or more instances of coexistence preamble 205 sent by a transmitting device or receiving device may include an instance of common waveform 215 and signature sequence 225 without omni-directional sensing request 220.

In some cases, omni-directional sensing request 220 may enable a receiver to apply at least two different sets of receiver vectors to enable the receiver to determine what signal or signals are detected and what signal or signals are not detected. In some examples, when omni-directional sensing is not used, a pre-configured, committed beam intended for upcoming communications may be applied on a corresponding antenna panel.

In one example, the present techniques include a directional medium reservation process for the data/control channel protection. In some cases, the directional medium reservation process may indicate a transmission duration of an upcoming directional transmission. In some examples, the directional medium reservation process may include an indication of a selected signal strength offset or a predetermined signal strength offset. In some cases, the directional medium reservation process may indicate the duration of requested directional receiver protection. In some examples, the directional medium reservation process may indicate a selected interfering signal strength offset or a predetermined interfering signal strength offset.

In one example, the signature sequence 225 may be used to provide directional receiver protection. In some cases, a transmitting device or receiving device may send the signature sequence 225 to reserve a medium on which to transmit data/control transmission 210 directionally. In some cases, signature sequence 225 may be used to indicate an interfering signal strength offset. In some cases, the common waveform 215 may indicate whether directional sensing is allowed. In some cases, a transmitting device or receiving device that currently controls the medium may approve directional transmissions. For example, a receiving device may approve directional transmissions from a transmitting device. In some cases, the medium-controlling device (e.g., transmitting device or receiving device) may mandate omni-directional sensing.

In some examples, the signature sequence 225 may include predetermined or agreed-upon information. Examples of this predetermined information in the signature sequence 225 may include a medium reservation length (e.g., predetermined duration of a transmission, a Transmit Opportunity (TXOP), etc.). In some cases, the signature sequence may include a directional sensing request. In some cases, the signature sequence 225 may indicate that a node may ignore coexistence preamble 205 and/or an associated data/control transmission 210 when an energy level associated with the coexistence preamble 205 and/or associated data/control transmission 210 is below a predetermined energy level threshold. In some examples, the signature sequence 225 may indicate information regarding a dwell time (e.g., a minimum dwell time, a predetermined dwell time, a maximum dwell time, etc.).

Figure 3:
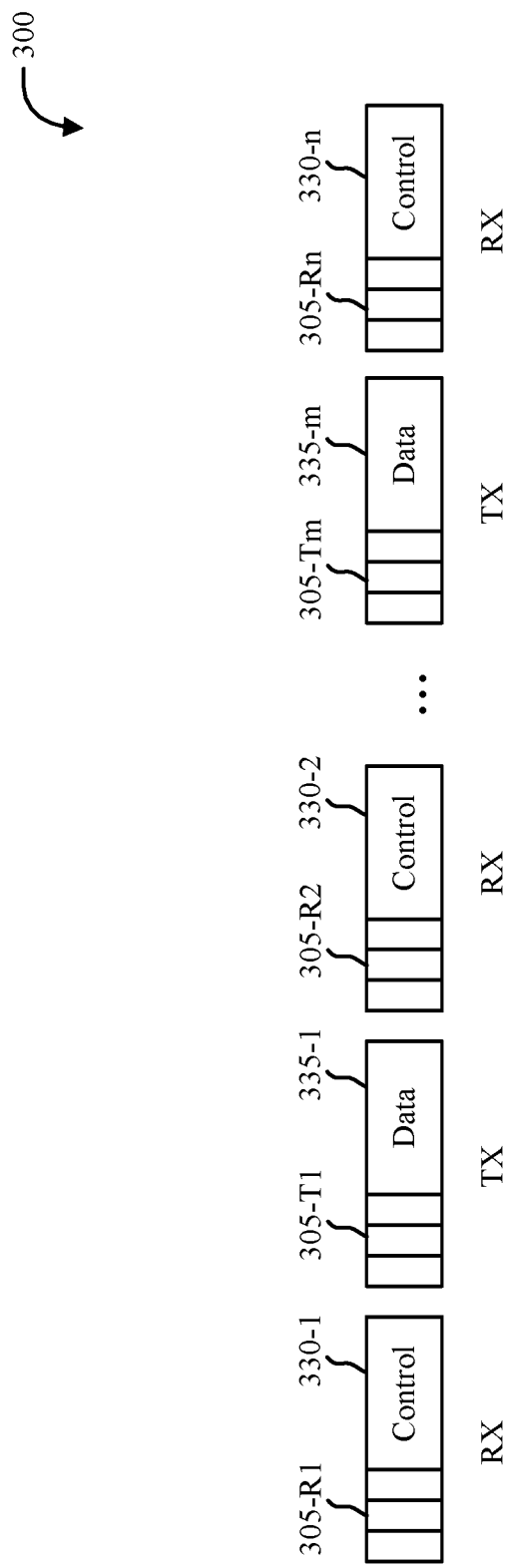
FIG. 3 illustrates an example of a common waveform design that supports intertechnology medium sharing for millimeter wave in accordance with aspects of the present disclosure.

FIG. 3 illustrates an example of a common waveform design 300 that supports intertechnology medium sharing for millimeter wave in accordance with aspects of the present disclosure. In some examples, common waveform design 300 may implement aspects of wireless communication system 100.

As illustrated, the common waveform design 300 includes a sequence of transmissions between a transmitting device and a receiving device. In one example, a receiving device may transmit coexistence preamble 305-R1 to reserve a medium. In some cases, the receiving device may then transmit control information 330-1 (e.g., control signaling, feedback, etc.) to a transmitting device. Alternatively, the receiving device may transmit coexistence preamble 305-R1 for receiver protection to protect incoming transmissions from the transmitting device. For example, the receiving device may transmit coexistence preamble 305-R1 without sending control information 330-1 to the transmitting device. Instead, the receiving device may transmit coexistence preamble 305-R1 to protect the medium and receive data transmission 335-1 from the transmitting device.

In some cases, the transmitting device may transmit coexistence preamble 305-T1 to protect the medium before transmitting data transmission 335-1. Alternatively, the transmitting device may transmit data transmission 335-1 without transmitting coexistence preamble 305-T1. For example, the transmitting device may transmit data transmission 335-1 after receiving device transmits coexistence preamble 305-R1 to reserve the medium. As shown, the transmitting device and/or receiving device may continue to transmit coexistence preambles (e.g., 305-Tm, 305-Rn, etc.) until m transmissions have been sent and/or n control transmissions have been sent (e.g., data transmission 335-m, control transmission 330-n, etc.). Accordingly, the receiving device may also protect the same medium for a fixed amount of time to send control and/or feedback information to the transmitting device and/or protect transmissions sent by the transmitting device to the receiving device, and continue doing so between one or more data transmissions from the transmitting device, or each data transmission from the transmitting device.

Figure 4:
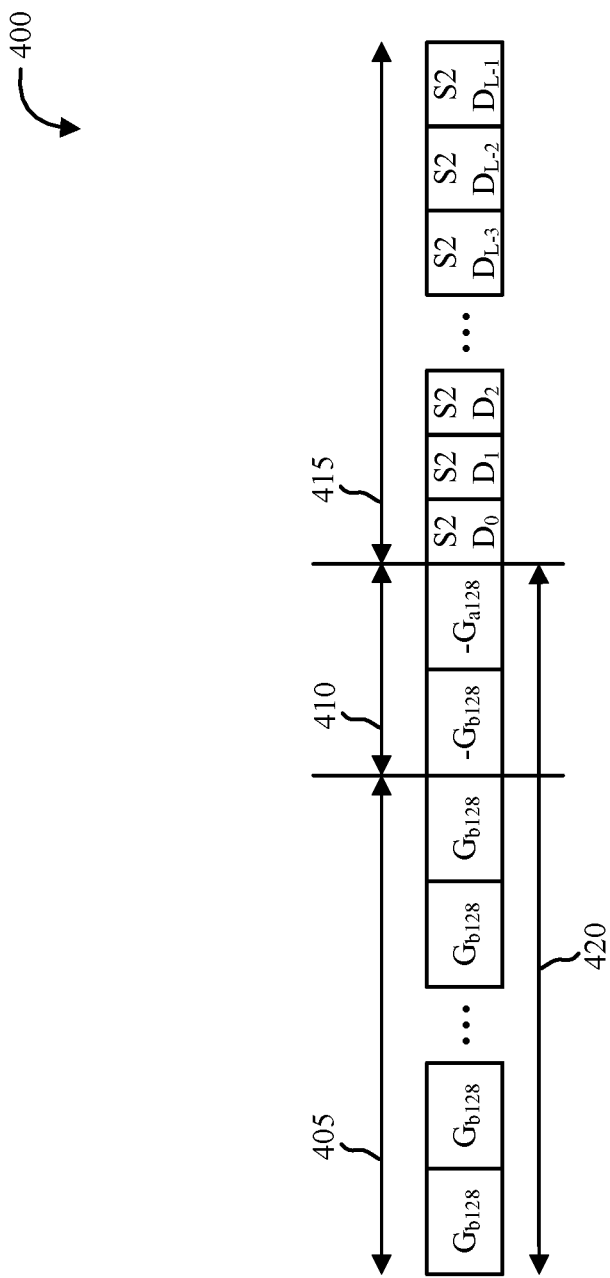
FIG. 4 illustrates an example of a common waveform design that supports intertechnology medium sharing for millimeter wave in accordance with aspects of the present disclosure.

FIG. 4 illustrates an example of a common waveform design 400 that supports intertechnology medium sharing for millimeter wave in accordance with aspects of the present disclosure. In some examples, common waveform design 400 may implement aspects of wireless communication system 100.

As illustrated, the common waveform design 400 includes a coexistence preamble 405, a synchronization field 410, and a data field 415. In some cases, coexistence preamble 405 may be an example of common waveform 215 of FIG. 2. Similarly, at least one of omni-directional sensing request 220, signature sequence 225, or data/control transmission 210 of FIG. 2, or any combination thereof, may be examples of what is included in data field 415.

In one example, coexistence preamble 405 and synchronization field 410 may be part of a short training field (STF) 420. In some cases, coexistence preamble 405 may include two or more Golay sequences in a row. For example, coexistence preamble 405 may include 40-50 of the same sequences repeated in a row (e.g., 40-50 of the same Golay sequence). In one example, the number of sequences repeated in coexistence preamble 405 may be based on a multiple of 8, such as 40 sequences or 48 sequences, etc. In some cases, STF 420 may be associated with a WiFi STF. For example, STF 420 may be an example of an 802.11 STF of a control physical layer (PHY) such as an 802.11ad STF.

As shown, STF 420 may include synchronization field 410 between coexistence preamble 405 and data field 415. In some cases, synchronization field 410 may include one or more sequences. As shown, synchronization field 410 may include at least two sequences. In one example, at least one of the sequences in synchronization field 410 may be based at least in part on one or more sequences from coexistence preamble 405. In one example, at least one sequence from synchronization field 410 may be a phase-shifted version of a sequence from coexistence preamble 405. For example, Golay sequence "$-G_{b_{128}}$" from synchronization field 410 may be a phase shifted version of Golay sequence "$G_{b_{128}}$" from coexistence preamble 405.

As shown, in one example data field 415 may be appended to STF 420. In one example, a node may send in a transmission STF 420 for a control PHY. In some cases, this transmission may include data field 415 appended to STF 420. In some examples, data field 415 may include encoded information (e.g., $D_0$ to $D_{L-1}$). In some cases, the encoded data in data field 415 may be part of a data sequence (e.g., a second sequence or S2). In one example, S2 may be based on a data sequence different from any sequence from coexistence preamble 405. Alternatively, S2 may be based at least in part on one or more sequences from coexistence preamble 405. In some cases, S2 may include one or more scrambled bits to avoid confusion with STF 420 when S2 is based on a sequence from coexistence preamble 405. For example, S2 may include one or more scrambled bits at the beginning of data field 415. In some examples, data field 415 may include coexistence information such as a medium reservation length (e.g., predetermined duration of a transmission, a Transmit Opportunity (TXOP), etc.), an omni-direction sensing request, a directional sensing request, and/or information regarding a dwell time (e.g., a minimum dwell time, a predetermined dwell time, a maximum dwell time, etc.). In one example, dwell time may include a minimum and/or maximum amount of time a device must occupy or transmit on a channel once the channel has been reserved by the device. When a device switches to a busy channel the device may not be able to transmit or receive channel information. After a period equal to a specified dwell time, the device may switch to a next channel in a sequence, which may be free. If the next channel is busy, the device may wait or switch to a next channel. The device may switch to a next channel after waiting a minimum dwell time, or may wait up to a maximum dwell time before switching to the next channel.

Figure 5:
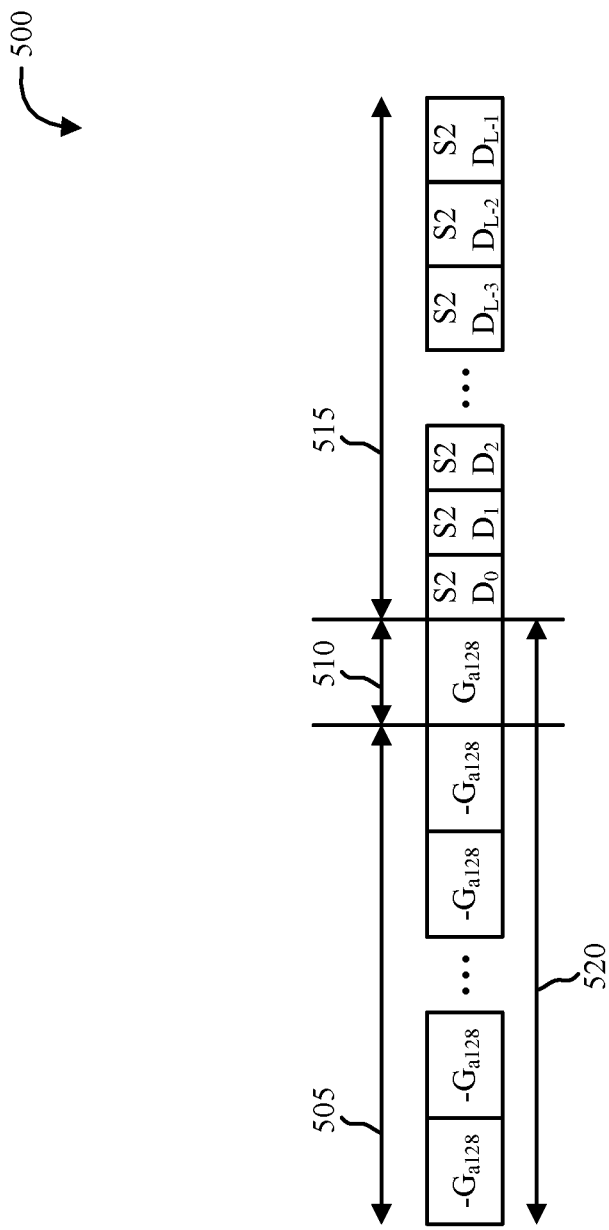
FIG. 5 illustrates an example of a common waveform design that supports intertechnology medium sharing for millimeter wave in accordance with aspects of the present disclosure.

FIG. 5 illustrates an example of a common waveform design 500 that supports intertechnology medium sharing for millimeter wave in accordance with aspects of the present disclosure. In some examples, common waveform design 500 may implement aspects of wireless communication system 100.

As illustrated, the common waveform design 500 includes a coexistence preamble 505, a synchronization field 510, and a data field 515. As shown, synchronization field 510 may include a single sequence (e.g., single Golay sequence). In one example, coexistence preamble 505 may be an example of coexistence preamble 205 of FIG. 2, coexistence preamble 305 of FIG. 3, and/or coexistence preamble 405 of FIG. 4. Similarly, data field 515 may be an example of data field 415 from FIG. 4.

In some cases, coexistence preamble 505 may include two or more sequences in a row (e.g., two or more Golay sequences). For example, coexistence preamble 505 may include 10-20 of the same sequences repeated in a row. In one example, the number of sequences repeated in coexistence preamble 505 may be based on a multiple of 8, such as 8 sequences, 16 sequences, or 24 sequences, 32 sequences, etc. In one example, coexistence preamble 505 and synchronization field 510 may be part of a STF 520. In some cases, STF 520 may be associated with a WiFi STF. For example, STF 520 may be an example of an 802.11 STF of a single carrier physical layer (SC PHY) STF such as an 802.11ad STF.

Figure 6:
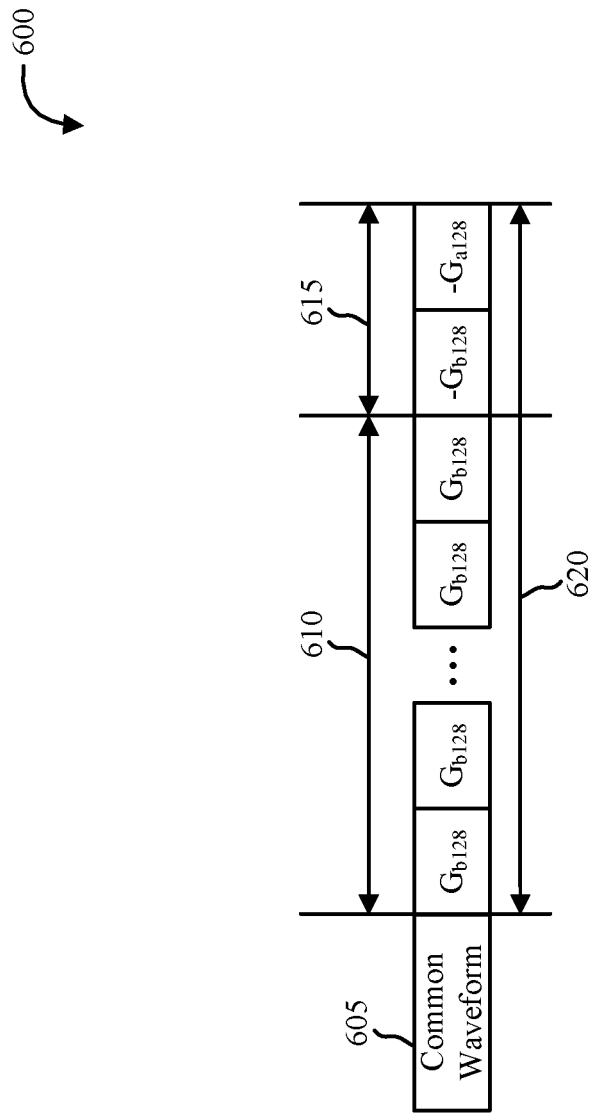
FIG. 6 illustrates an example of a common waveform design that supports intertechnology medium sharing for millimeter wave in accordance with aspects of the present disclosure.

FIG. 6 illustrates an example of a common waveform design 600 that supports intertechnology medium sharing for millimeter wave in accordance with aspects of the present disclosure. In some examples, common waveform design 600 may implement aspects of wireless communication system 100.

As illustrated, the common waveform design 600 includes a common waveform 605, a coexistence preamble 610, and a synchronization field 615. In one embodiment, common waveform 605 may be an example of one or more components of coexistence preamble 205 (e.g., common waveform 215, omni-direction sensing request 220, and/or signature sequence 225). In one example, common waveform 605 may include a data field (e.g., data field 415 from FIG. 4, data field 515 from FIG. 5, etc.). In one example, common waveform 605 may puncture at least a portion of at least one sequence from coexistence preamble 610. In some cases, coexistence preamble 610 may be an example of coexistence preamble 205 of FIG. 2, coexistence preamble 305 of FIG. 3, coexistence preamble 405 of FIG. 4, and/or coexistence preamble 505 of FIG. 5. In one example, coexistence preamble 610 and synchronization field 615 may be part of a STF 620. In some cases, STF 620 may be associated with a WiFi STF. For example, STF 620 may be an example of an 802.11 STF of a control PHY such as an 802.11ad STF. In one example, common waveform 605 may be prepended prior to STF 620 as shown. In some cases, common waveform 605 may include coexistence information such as a medium reservation length (e.g., predetermined duration of a transmission, a Transmit Opportunity (TXOP), etc.), an omni-direction sensing request, a directional sensing request, and/or information regarding a dwell time (e.g., a minimum dwell time, a maximum dwell time, etc.). In some cases, a receiver may use cross-correlation for detection in relation to detecting one or more components of common waveform design 600 (e.g., detecting common waveform 605, detecting coexistence preamble 610, detecting synchronization field 615, detecting STF 620, etc.). In some examples, after detection of common waveform 605 by the receiver, the receiver may detect coexistence preamble 610. Accordingly, in some examples the receiver may store bits from common waveform 605 and review the stored bits of common waveform 605 after detection of coexistence preamble 610 and/or detection of synchronization field 615.

Figure 7:
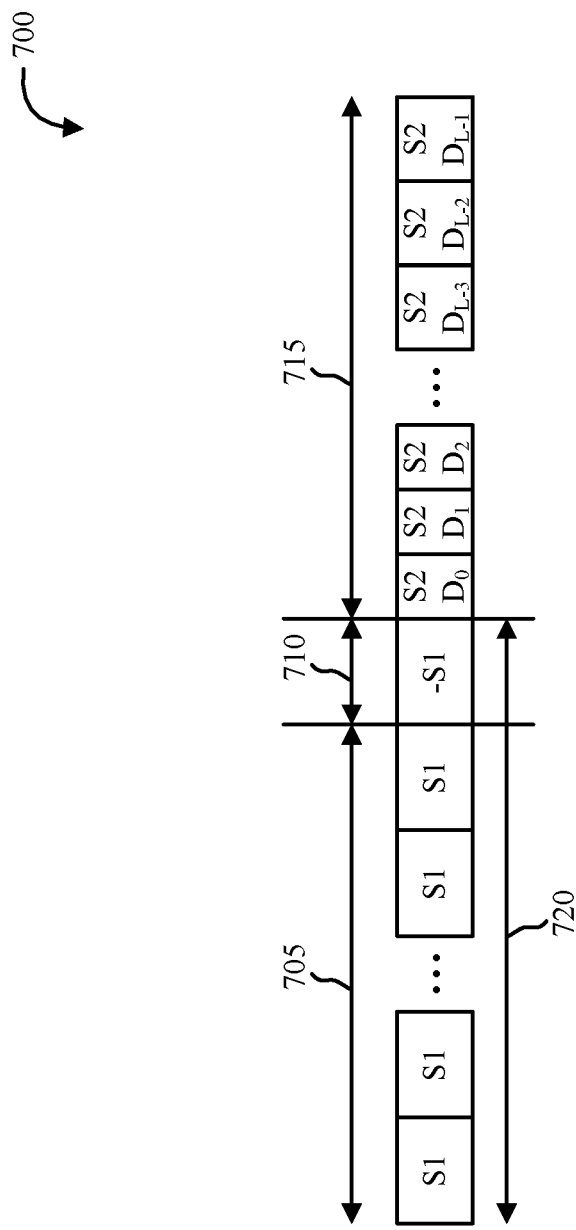
FIG. 7 illustrates an example of a common waveform design that supports intertechnology medium sharing for millimeter wave in accordance with aspects of the present disclosure.

FIG. 7 illustrates an example of a common waveform design 700 that supports intertechnology medium sharing for millimeter wave in accordance with aspects of the present disclosure. In some examples, common waveform design 700 may implement aspects of wireless communication system 100.

As illustrated, the common waveform design 700 includes coexistence preamble 705, a synchronization field 710, and a data field 715. In one example, coexistence preamble 705 may be an example of coexistence preamble 205 of FIG. 2, coexistence preamble 405 of FIG. 4, coexistence preamble 505 of FIG. 5, and/or coexistence preamble 610 of FIG. 6. Similarly, data field 715 may be an example of data field 415 from FIG. 4 and/or data field 515 from FIG. 5.

In one example, coexistence preamble 705 may include first sequence S1 repeated two or more times in a row. In some cases, synchronization field 710 may include a phase-shifted version of S1 (e.g., −S1). As shown, synchronization field 710 may include a single instance of sequence −S1. Alternatively, synchronization field 710 may include two or more instances of a sequence such as −S1.

In one example, coexistence preamble 705 and synchronization field 710 may be part of a STF 720. However, in some cases, coexistence preamble 705 may not include or be based on a sequence used in an 802.11 STF. Instead, coexistence preamble 705 may include a STF used for a common waveform in intertechnology medium sharing for millimeter wave. As shown, data field 715 may include a repeated set of a second sequence S2. In some cases, S2 may be equal to or based at least in part on S1. Alternatively, S2 may be different from or not repeat a value or segment of values from S1. In some cases, a receiver may bypass using cross-correlation for detection in relation to common waveform design 700.

Figure 8:
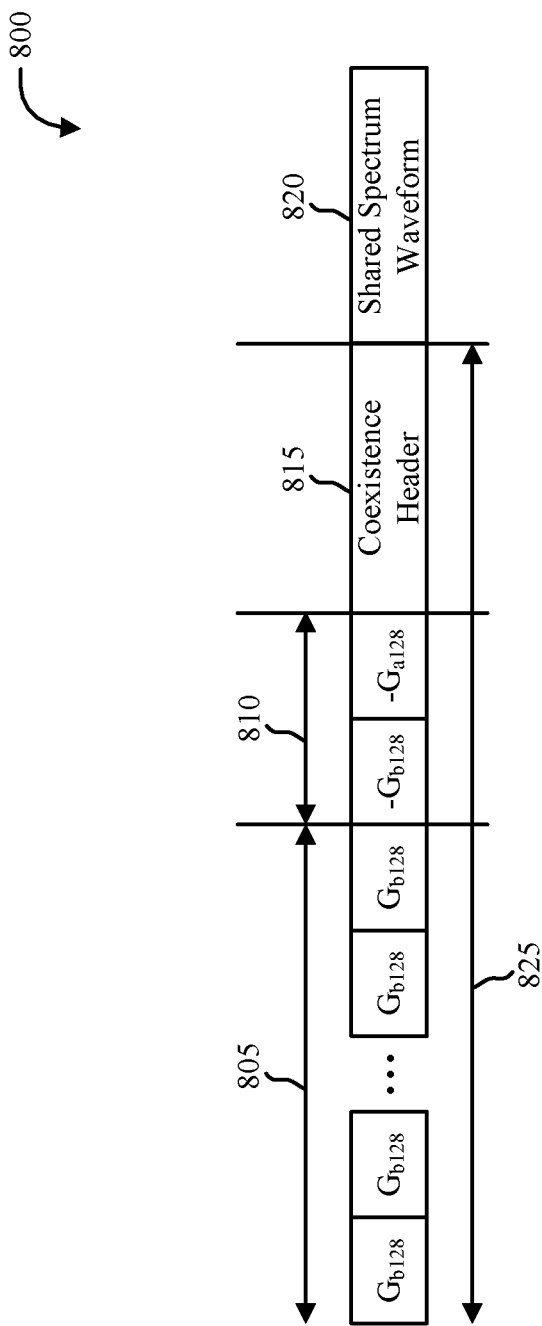
FIG. 8 illustrates an example of a common waveform design that supports intertechnology medium sharing for millimeter wave in accordance with aspects of the present disclosure.

FIG. 8 illustrates an example of a common waveform design 800 that supports intertechnology medium sharing for millimeter wave in accordance with aspects of the present disclosure. In some examples, common waveform design 800 may implement aspects of wireless communication system 100.

As illustrated, the common waveform design 800 includes a coexistence preamble 805, a synchronization field 810, a coexistence header 815, and a shared spectrum waveform 820. In one example, shared spectrum waveform 820 may include a coexistence preamble of a shared radio frequency spectrum band. In some cases, an unlicensed radio frequency spectrum band (e.g., new radio unlicensed (NR-U) may be one example of a shared radio frequency spectrum band.

In one example, coexistence preamble 805 may be an example of coexistence preamble 205 of FIG. 2, coexistence preamble 305 of FIG. 3, coexistence preamble 405 of FIG. 4, coexistence preamble 505 of FIG. 5, coexistence preamble 610 of FIG. 6, and/or coexistence preamble 705 of FIG. 7. In some cases, synchronization field 810 may be an example of synchronization field 410 of FIG. 4, synchronization field 510 of FIG. 5, synchronization field 615 of FIG. 6, and/or synchronization field 710 of FIG. 7. In some cases, synchronization field 810 and/or coexistence header 815 may be an example of omni-directional sensing request 220 of FIG. 2. In some cases, coexistence header 815 may be an example of coexistence preamble 205 or any part of coexistence preamble 205 of FIG. 2. In one example, shared spectrum waveform 820 may be an example of coexistence preamble 205 or any part of coexistence preamble 205 of FIG. 2. For example, shared spectrum waveform 820 may be an example of signature sequence 225 of FIG. 2.

In one example, coexistence preamble 805, synchronization field 810, and/or coexistence header 815 may be part of a STF 825. In some cases, coexistence preamble 805 may include two or more sequences in a row (e.g., two or more Golay sequences). For example, coexistence preamble 805 may include 40-50 of the same sequences repeated in a row. In one example, the number of sequences repeated in coexistence preamble 805 may be based on a multiple of 8, such as 40 sequences or 48 sequences, etc. In some cases, STF 825 may be associated with a WiFi STF. For example, STF 825 may be an example of an 802.11 STF of a control PHY such as an 802.11ad STF.

Figure 9:
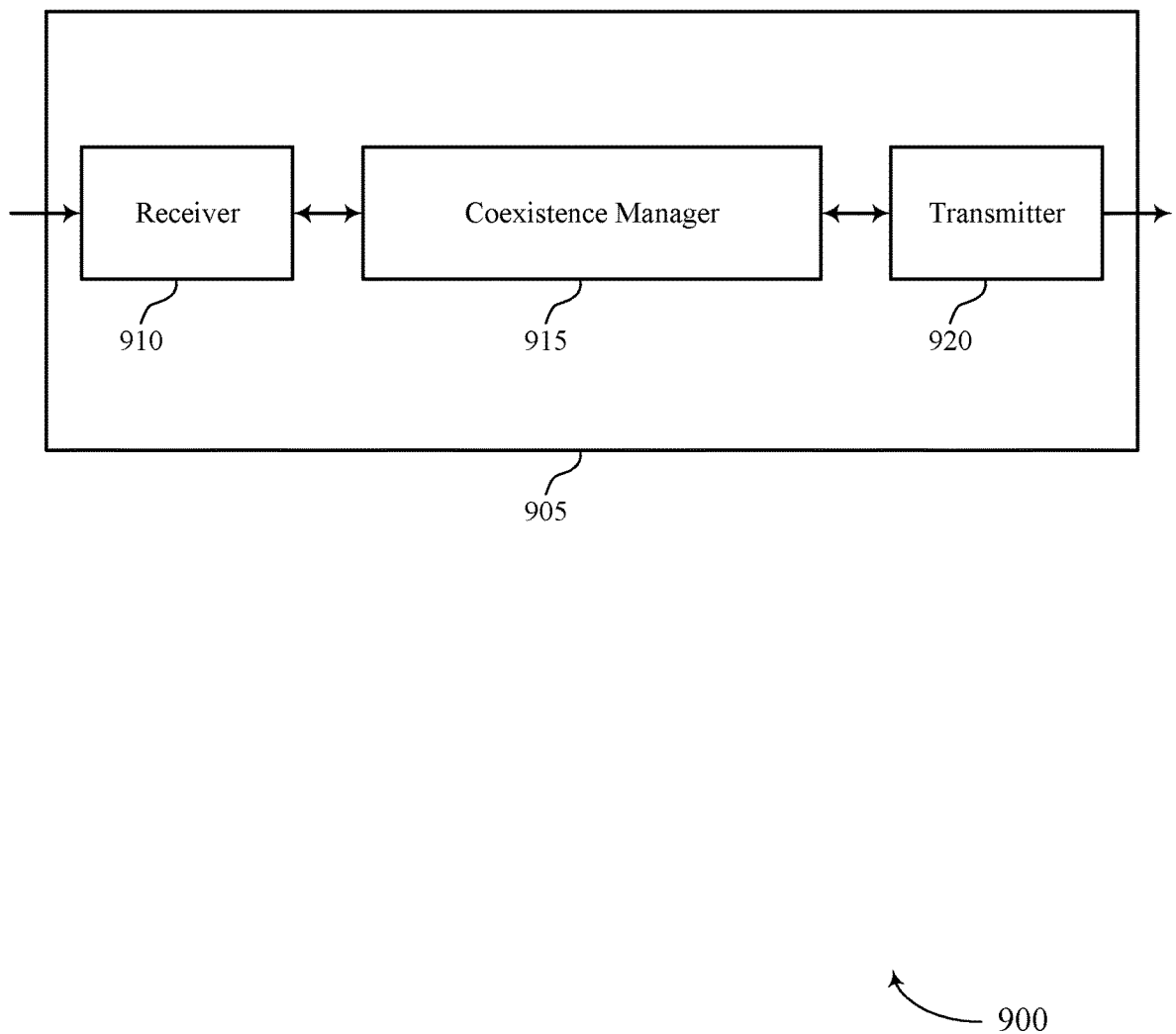
FIGS. 9 and 10 show block diagrams of devices that support intertechnology medium sharing for millimeter wave in accordance with aspects of the present disclosure.

FIG. 9 shows a block diagram 900 of a device 905 that supports intertechnology medium sharing for millimeter wave in accordance with aspects of the present disclosure. The device 905 may be an example of aspects of a device as described herein. The device 905 may include a receiver 910, a coexistence manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to intertechnology medium sharing for millimeter wave, etc.). Information may be passed on to other components of the device 905. The receiver 910 may be an example of aspects of the transceiver 1220 described with reference to FIG. 12. The receiver 910 may utilize a single antenna or a set of antennas.

The coexistence manager 915 may generate, by a first wireless device, a first coexistence preamble configured to reserve a channel of a shared radio frequency band for a first period of time, where the first coexistence preamble includes an initial channel reservation sequence and a data field indicating information about the first period of time, perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment), and receive, during a gap period between the first segment and the second segment, a receiver protection signal from the second wireless device, the receiver protection signal including a second coexistence preamble configured to reserve the channel of the shared radio frequency band for a second period of time associated with the second transmission segment. The coexistence manager 915 may also receive a transmission (e.g., a downlink transmission or uplink transmission) from a first wireless device at a second wireless device, the transmission including a first coexistence preamble configured to reserve a channel of a shared radio frequency band for a first period of time, a first segment, and a second segment, where the first coexistence preamble includes an initial channel reservation sequence and a data field indicating information about the first period of time and transmit, during a gap period between the first segment and the second segment, a receiver protection signal from the second wireless device, the receiver protection signal including a second coexistence preamble configured to reserve the channel of the shared radio frequency band for a second period of time associated with the second transmission segment. The coexistence manager 915 may also monitor a channel of a shared radio frequency band as part of a channel sensing procedure (e.g., LBT procedure), receive, based on the monitoring, a coexistence preamble configured to reserve the channel for a first period of time, where the first coexistence preamble includes an initial channel reservation sequence and a data field indicating information about the first period of time, and back off from transmitting on the channel for at least the first period of time based on the received coexistence preamble. The coexistence manager 915 may be an example of aspects of the coexistence manager 1210 described herein.

The coexistence manager 915, or its sub-components, may be implemented in hardware, code (e.g., software or firmware) executed by a processor, or any combination thereof. If implemented in code executed by a processor, the functions of the coexistence manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The coexistence manager 915, or its sub-components, may be physically located at various positions, including being distributed such that portions of functions are implemented at different physical locations by one or more physical components. In some examples, the coexistence manager 915, or its sub-components, may be a separate and distinct component in accordance with various aspects of the present disclosure. In some examples, the coexistence manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
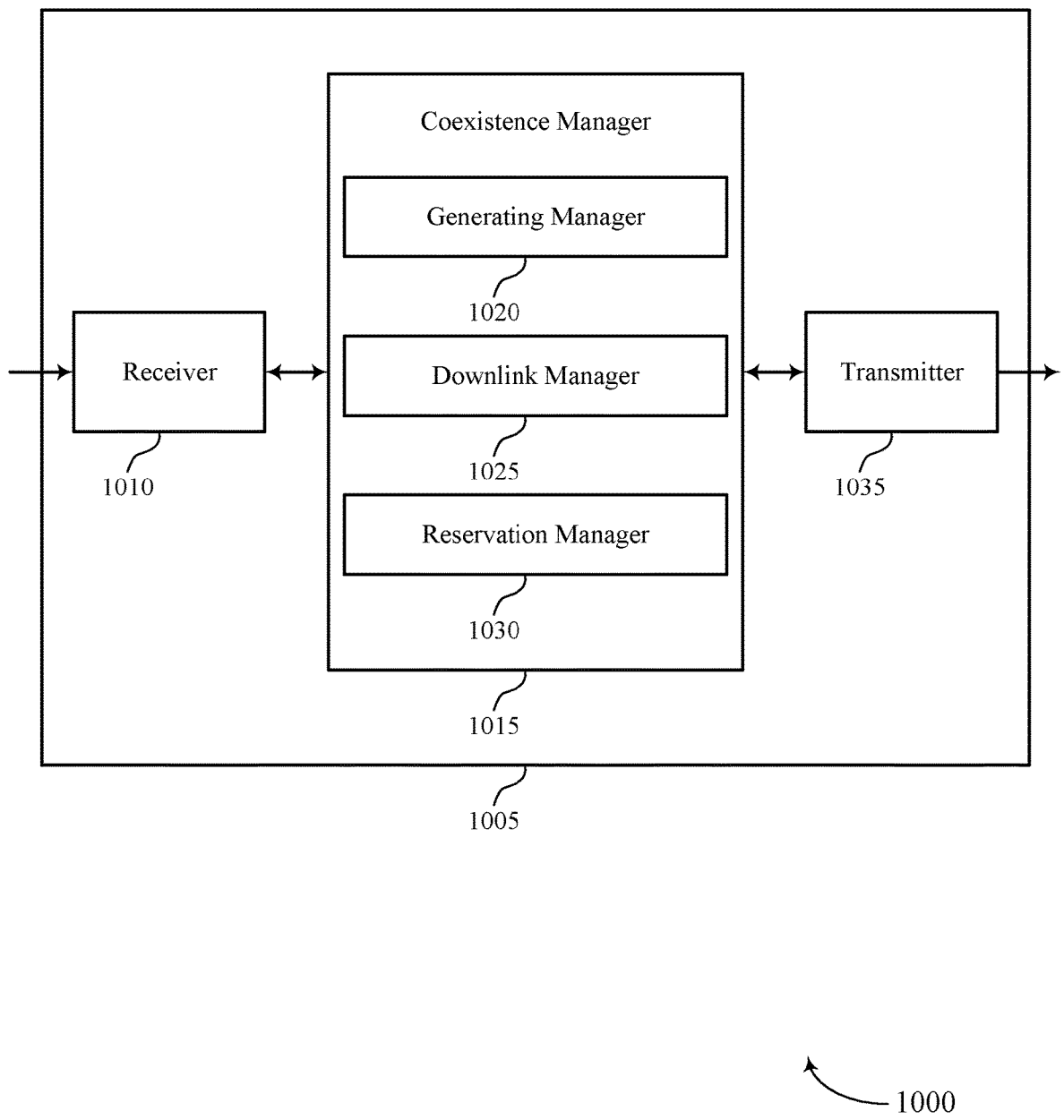

FIG. 10 shows a block diagram 1000 of a device 1005 that supports intertechnology medium sharing for millimeter wave in accordance with aspects of the present disclosure. The device 1005 may be an example of aspects of a device 905 or a device 115 as described herein. The device 1005 may include a receiver 1010, a coexistence manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to intertechnology medium sharing for millimeter wave, etc.). Information may be passed on to other components of the device 1005. The receiver 1010 may be an example of aspects of the transceiver 1220 described with reference to FIG. 12. The receiver 1010 may utilize a single antenna or a set of antennas.

The coexistence manager 1015 may be an example of aspects of the coexistence manager 915 as described herein. The coexistence manager 1015 may include a generating manager 1020, a downlink manager 1025, and a reservation manager 1030. The coexistence manager 1015 may be an example of aspects of the coexistence manager 1210 described herein.

The generating manager 1020 may generate, by a first wireless device, a first coexistence preamble configured to reserve a channel of a shared radio frequency band for a first period of time, where the first coexistence preamble includes an initial channel reservation sequence and a data field indicating information about the first period of time.

The downlink manager 1025 may perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment).

The reservation manager 1030 may receive, during a gap period between the first segment and the second segment, a receiver protection signal from the second wireless device, the receiver protection signal including a second coexistence preamble configured to reserve the channel of the shared radio frequency band for a second period of time associated with the second transmission segment.

The downlink manager 1025 may receive a transmission (e.g., a downlink transmission or uplink transmission) from a first wireless device at a second wireless device, the transmission including a first coexistence preamble configured to reserve a channel of a shared radio frequency band for a first period of time, a first segment, and a second segment, where the first coexistence preamble includes an initial channel reservation sequence and a data field indicating information about the first period of time.

The reservation manager 1030 may transmit, during a gap period between the first segment and the second segment, a receiver protection signal from the second wireless device, the receiver protection signal including a second coexistence preamble configured to reserve the channel of the shared radio frequency band for a second period of time associated with the second transmission segment.

The control manager 1035 may monitor a channel of a shared radio frequency band as part of a channel sensing procedure (e.g., LBT procedure). The downlink manager 1025 may receive, based on the monitoring, a coexistence preamble configured to reserve the channel for a first period of time, where the first coexistence preamble includes an initial channel reservation sequence and a data field indicating information about the first period of time. The reservation manager 1030 may back off from transmitting on the channel for at least the first period of time based on the received coexistence preamble.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
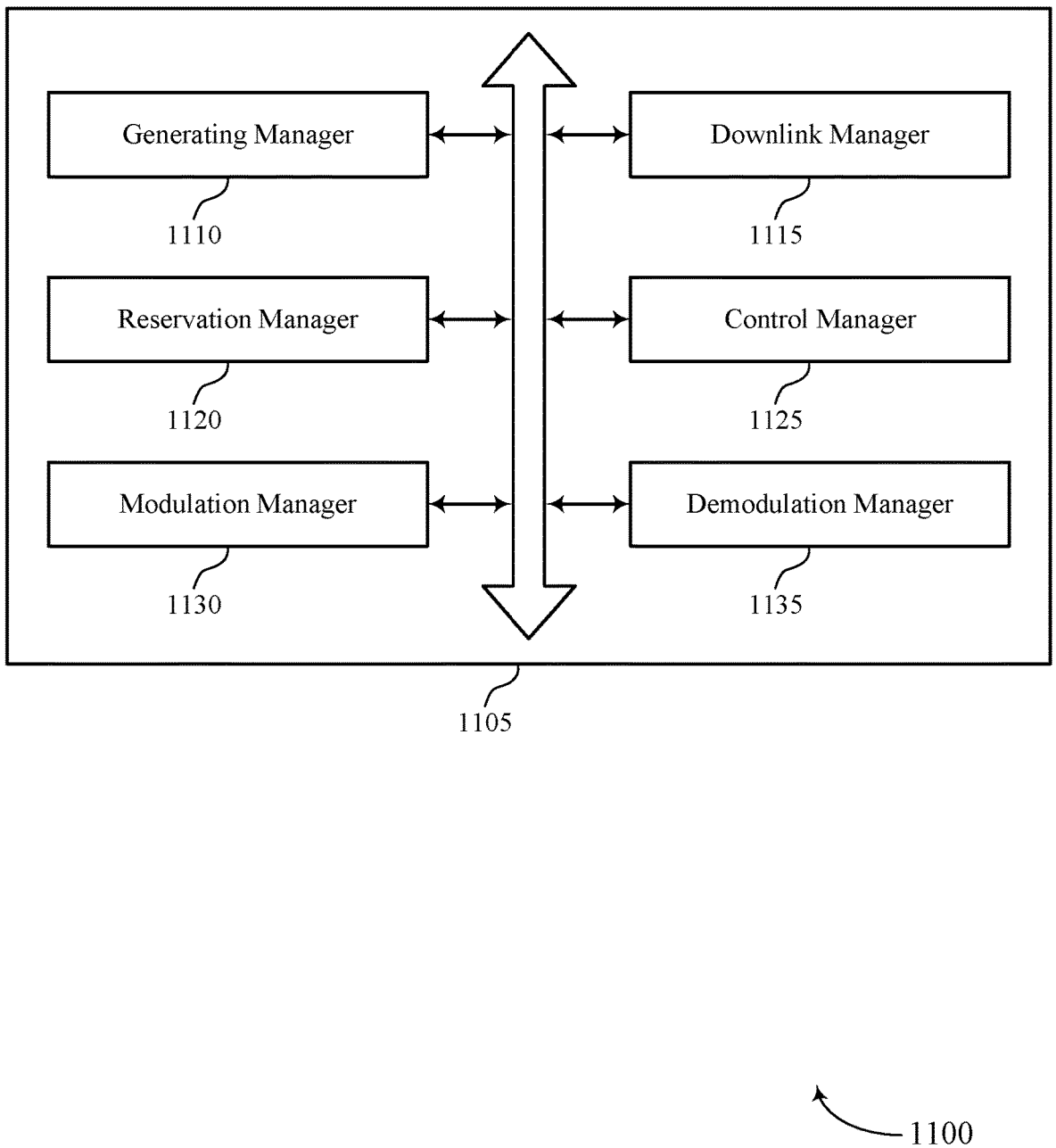
FIG. 11 shows a block diagram of a coexistence manager that supports intertechnology medium sharing for millimeter wave in accordance with aspects of the present disclosure.

FIG. 11 shows a block diagram 1100 of a coexistence manager 1105 that supports intertechnology medium sharing for millimeter wave in accordance with aspects of the present disclosure. The coexistence manager 1105 may be an example of aspects of a coexistence manager 915, a coexistence manager 1015, or a coexistence manager 1210 described herein. The coexistence manager 1105 may include a generating manager 1110, a downlink manager 1115, a reservation manager 1120, a control manager 1125, a modulation manager 1130, and a demodulation manager 1135. Each of these modules may communicate, directly or indirectly, with one another (e.g., via one or more buses).

The generating manager 1110 may generate, by a first wireless device, a first coexistence preamble configured to reserve a channel of a shared radio frequency band for a first period of time, where the first coexistence preamble includes an initial channel reservation sequence and a data field indicating information about the first period of time.

The downlink manager 1115 may perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment). In some examples, the downlink manager 1115 may perform a beam sweep during at least a portion of the transmission.

In some examples, downlink manager 1115 may receive a transmission (e.g., a downlink transmission or uplink transmission) from a first wireless device at a second wireless device, the transmission including a first coexistence preamble configured to reserve a channel of a shared radio frequency band for a first period of time, a first segment, and a second segment, where the first coexistence preamble includes an initial channel reservation sequence and a data field indicating information about the first period of time.

In some examples, downlink manager 1115 may receive, based on the control manager 1035 monitoring a channel of a shared radio frequency band, a coexistence preamble configured to reserve the channel for a first period of time, where the first coexistence preamble includes an initial channel reservation sequence and a data field indicating information about the first period of time.

The reservation manager 1120 may receive, during a gap period between the first segment and the second segment, a receiver protection signal from the second wireless device, the receiver protection signal including a second coexistence preamble configured to reserve the channel of the shared radio frequency band for a second period of time associated with the second transmission segment.

In some examples, the reservation manager 1120 may transmit, during a gap period between the first segment and the second segment, a receiver protection signal from the second wireless device, the receiver protection signal including a second coexistence preamble configured to reserve the channel of the shared radio frequency band for a second period of time associated with the second transmission segment. In some examples, the reservation manager 1120 may back off from transmitting on the channel for at least the first period of time based on the received coexistence preamble.

In some examples, the reservation manager 1120 may prepend the first coexistence preamble to a short training field (STF) of a wireless local area network (WLAN) frame. In some examples, the reservation manager 1120 may puncture a short training field (STF) of a WLAN frame with the first coexistence preamble. In some examples, the reservation manager 1120 may transmit the first coexistence preamble a fixed distance following a short training field (STF) of a WLAN frame. In some examples, the reservation manager 1120 may transmit a padding signal between an end of the STF of the WLAN frame and a beginning of the first coexistence preamble.

In some examples, the reservation manager 1120 may transmit a set of coexistence preambles during the first period of time. In some examples, the reservation manager 1120 may receive the first coexistence preamble a fixed distance following a short training field (STF) of a WLAN frame. In some examples, the reservation manager 1120 may receive a padding signal between an end of the STF of the WLAN frame and a beginning of the first coexistence preamble. In some examples, the reservation manager 1120 may receive a set of coexistence preambles during the first period of time.

In some examples, the control manager 1125 may monitor a channel of a shared radio frequency band as part of a channel sensing procedure (e.g., LBT procedure). The control manager 1125 may receive with the receiver protection signal one or more of: an acknowledgment message from the second wireless device for the first segment, a negative acknowledgment message from the second wireless device for the first segment, or a control channel transmission from the second wireless device.

In some examples, the control manager 1125 may transmit in connection with the receiver protection signal one or more of: an acknowledgment message from the second wireless device for the first segment, a negative acknowledgment message from the second wireless device for the first segment, or a control channel transmission from the second wireless device.

The modulation manager 1130 may generate the data field of the first coexistence preamble by modulating a phase of a Golay sequence based on the information about the first period of time. The demodulation manager 1135 may demodulate a phase of a Golay sequence to obtain the information about the first period of time.

Figure 12:
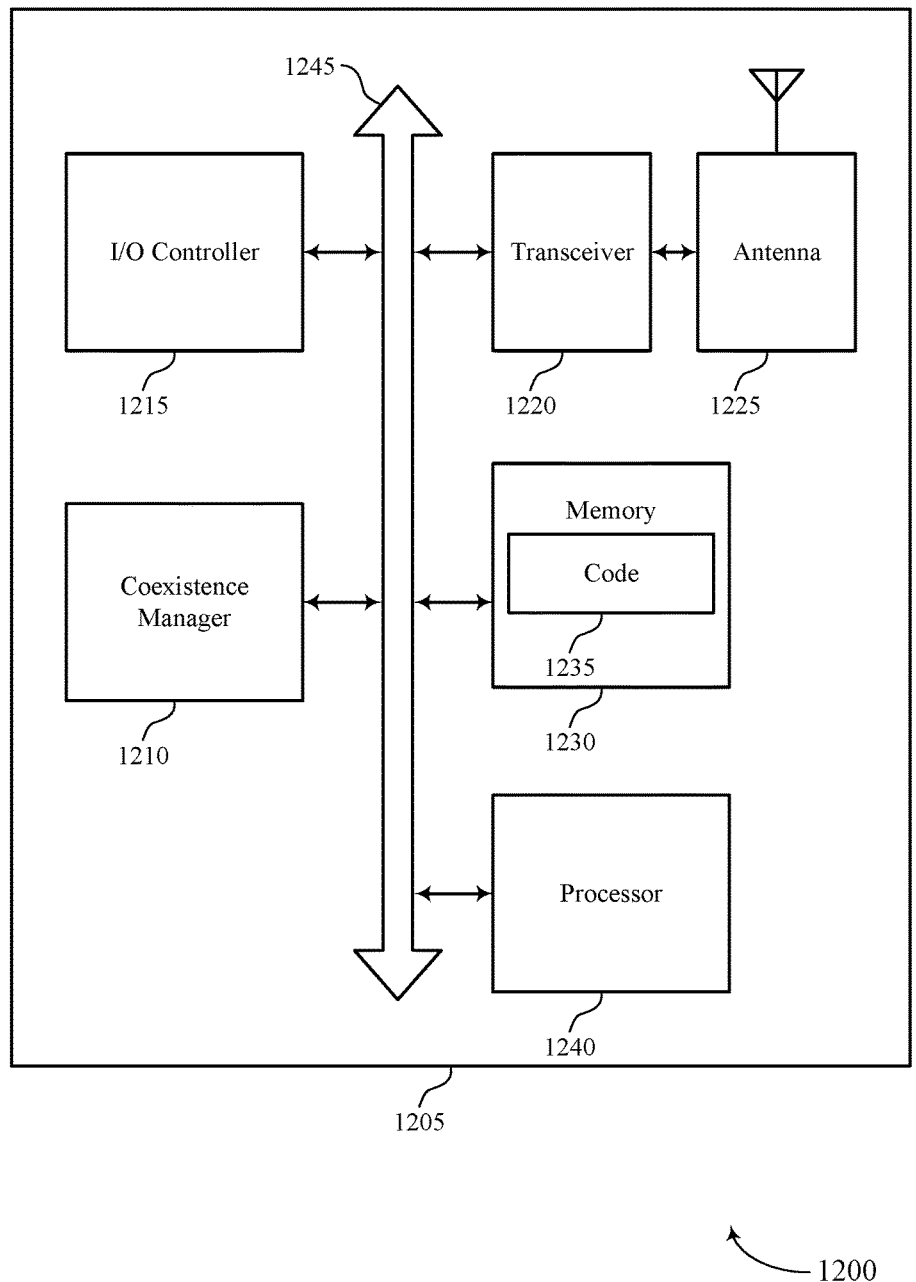
FIG. 12 shows a diagram of a system including a device that supports intertechnology medium sharing for millimeter wave in accordance with aspects of the present disclosure.

FIG. 12 shows a diagram of a system 1200 including a device 1205 that supports intertechnology medium sharing for millimeter wave in accordance with aspects of the present disclosure. The device 1205 may be an example of or include the components of device 905, device 1005, or a device as described herein. The device 1205 may include components for bi-directional voice and data communications including components for transmitting and receiving communications, including a coexistence manager 1210, an I/O controller 1215, a transceiver 1220, an antenna 1225, memory 1230, and a processor 1240. These components may be in electronic communication via one or more buses (e.g., bus 1245).

The coexistence manager 1210 may generate, by a first wireless device, a first coexistence preamble configured to reserve a channel of a shared radio frequency band for a first period of time, where the first coexistence preamble includes an initial channel reservation sequence and a data field indicating information about the first period of time, perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment), and receive, during a gap period between the first segment and the second segment, a receiver protection signal from the second wireless device, the receiver protection signal including a second coexistence preamble configured to reserve the channel of the shared radio frequency band for a second period of time associated with the second transmission segment. The coexistence manager 1210 may also receive a transmission (e.g., a downlink transmission or uplink transmission) from a first wireless device at a second wireless device, the transmission including a first coexistence preamble configured to reserve a channel of a shared radio frequency band for a first period of time, a first segment, and a second segment, where the first coexistence preamble includes an initial channel reservation sequence and a data field indicating information about the first period of time and transmit, during a gap period between the first segment and the second segment, a receiver protection signal from the second wireless device, the receiver protection signal including a second coexistence preamble configured to reserve the channel of the shared radio frequency band for a second period of time associated with the second transmission segment. The coexistence manager 1210 may also monitor a channel of a shared radio frequency band as part of a channel sensing procedure (e.g., LBT procedure), receive, based on the monitoring, a coexistence preamble configured to reserve the channel for a first period of time, where the first coexistence preamble includes an initial channel reservation sequence and a data field indicating information about the first period of time, and back off from transmitting on the channel for at least the first period of time based on the received coexistence preamble.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting intertechnology medium sharing for millimeter wave).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
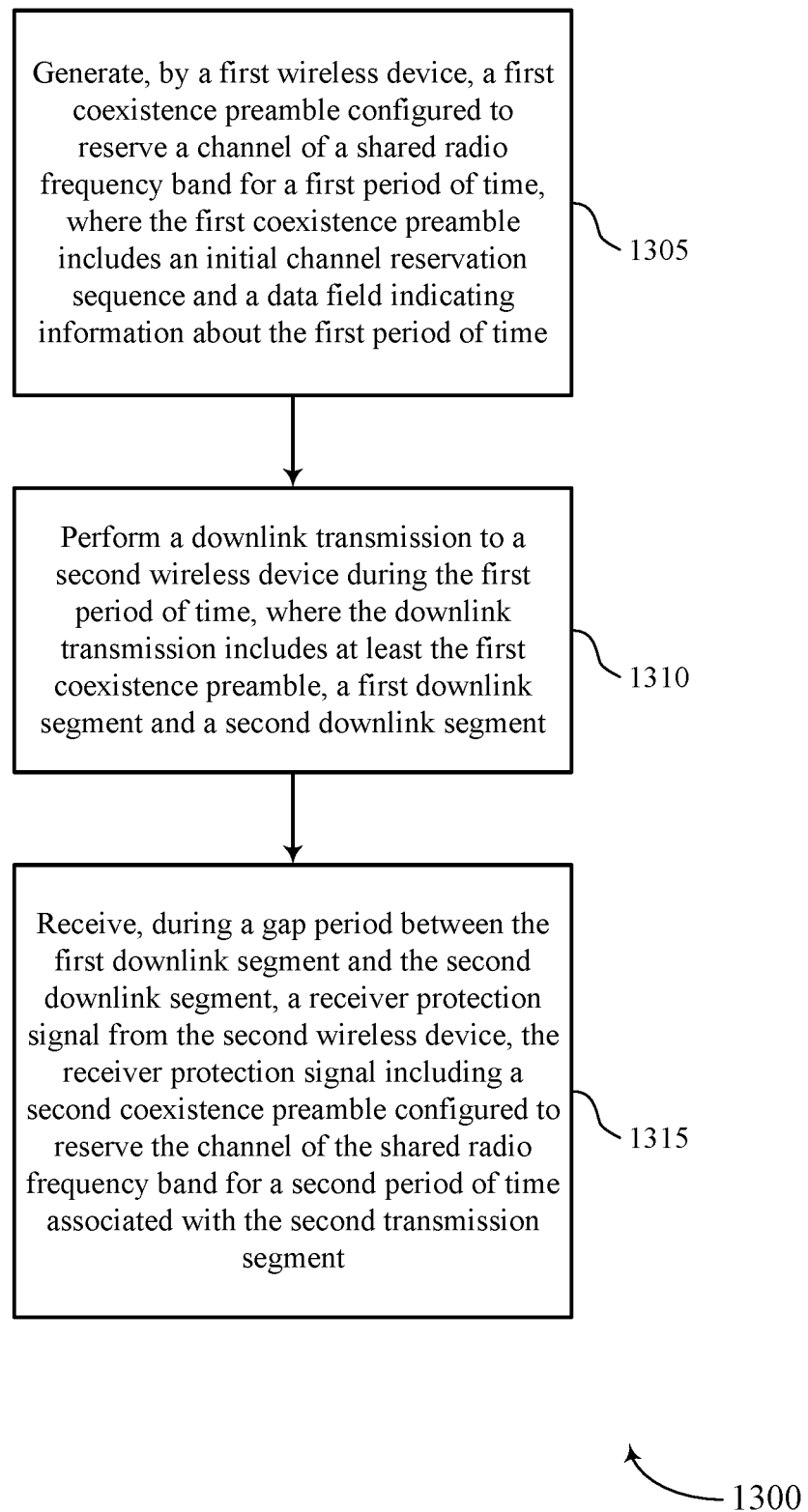
FIGS. 13 through 17 show flowcharts illustrating methods that support intertechnology medium sharing for millimeter wave in accordance with aspects of the present disclosure.

FIG. 13 shows a flowchart illustrating a method 1300 that supports intertechnology medium sharing for millimeter wave in accordance with aspects of the present disclosure. The operations of method 1300 may be implemented by a device or its components as described herein. For example, the operations of method 1300 may be performed by a coexistence manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1305, the device may generate, by a first wireless device, a first coexistence preamble configured to reserve a channel of a shared radio frequency band for a first period of time, where the first coexistence preamble includes an initial channel reservation sequence and a data field indicating information about the first period of time. The operations of 1305 may be performed according to the methods described herein. In some examples, aspects of the operations of 1305 may be performed by a generating manager as described with reference to FIGS. 9 through 12.

At 1310, the device may perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment). The operations of 1310 may be performed according to the methods described herein. In some examples, aspects of the operations of 1310 may be performed by a downlink manager as described with reference to FIGS. 9 through 12.

At 1315, the device may receive, during a gap period between the first segment and the second segment, a receiver protection signal from the second wireless device, the receiver protection signal including a second coexistence preamble configured to reserve the channel of the shared radio frequency band for a second period of time associated with the second transmission segment. The operations of 1315 may be performed according to the methods described herein. In some examples, aspects of the operations of 1315 may be performed by a reservation manager as described with reference to FIGS. 9 through 12.

Figure 14:
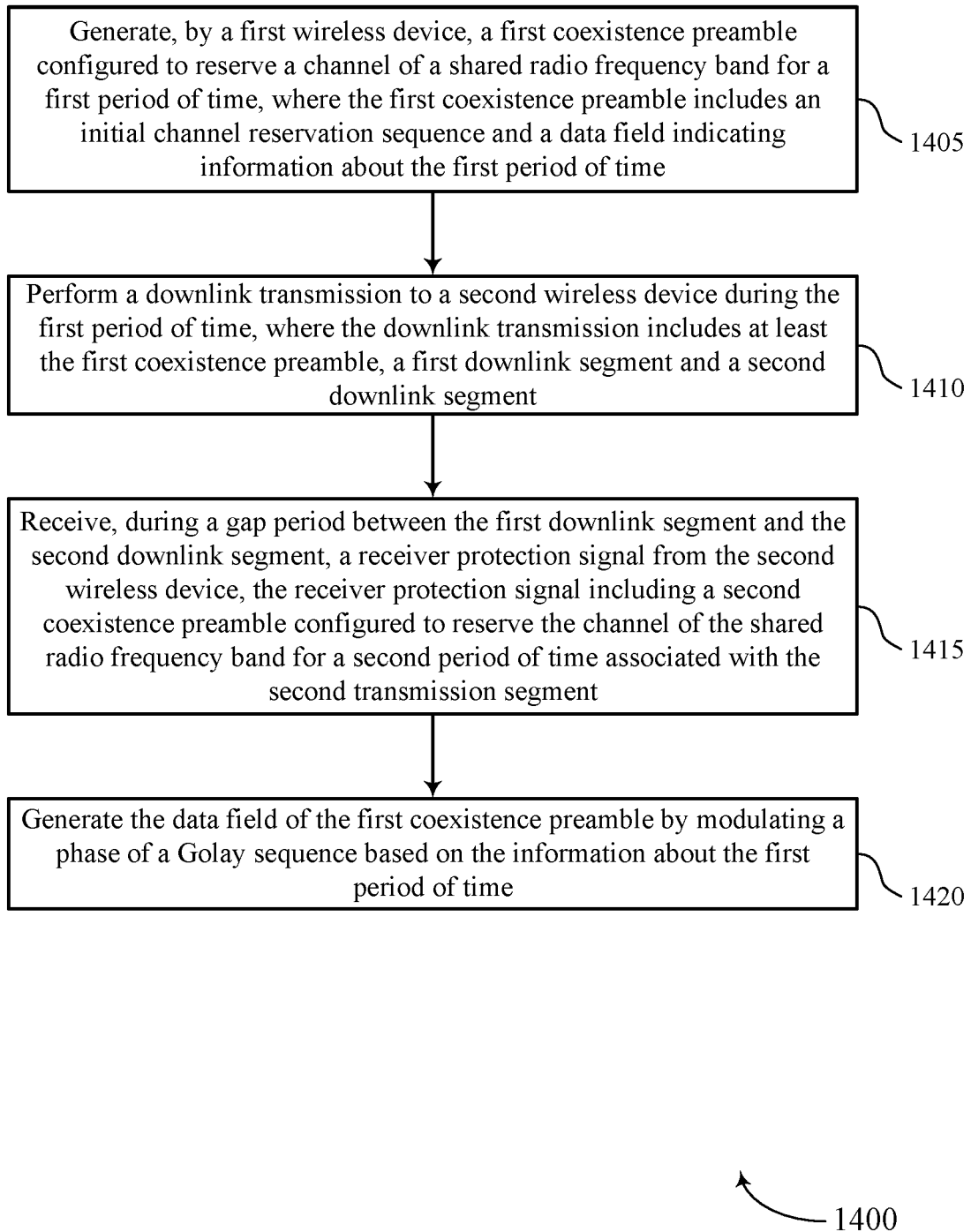

FIG. 14 shows a flowchart illustrating a method 1400 that supports intertechnology medium sharing for millimeter wave in accordance with aspects of the present disclosure. The operations of method 1400 may be implemented by a device or its components as described herein. For example, the operations of method 1400 may be performed by a coexistence manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1405, the device may generate, by a first wireless device, a first coexistence preamble configured to reserve a channel of a shared radio frequency band for a first period of time, where the first coexistence preamble includes an initial channel reservation sequence and a data field indicating information about the first period of time. The operations of 1405 may be performed according to the methods described herein. In some examples, aspects of the operations of 1405 may be performed by a generating manager as described with reference to FIGS. 9 through 12.

At 1410, the device may perform a transmission (e.g., a downlink transmission or uplink transmission) to a second wireless device during the first period of time, where the transmission includes at least the first coexistence preamble, a first segment (e.g., a first downlink segment) and a second segment (e.g., a second downlink segment). The operations of 1410 may be performed according to the methods described herein. In some examples, aspects of the operations of 1410 may be performed by a downlink manager as described with reference to FIGS. 9 through 12.

At 1415, the device may receive, during a gap period between the first segment and the second segment, a receiver protection signal from the second wireless device, the receiver protection signal including a second coexistence preamble configured to reserve the channel of the shared radio frequency band for a second period of time associated with the second transmission segment. The operations of 1415 may be performed according to the methods described herein. In some examples, aspects of the operations of 1415 may be performed by a reservation manager as described with reference to FIGS. 9 through 12.

At 1420, the device may generate the data field of the first coexistence preamble by modulating a phase of a Golay sequence based on the information about the first period of time. The operations of 1420 may be performed according to the methods described herein. In some examples, aspects of the operations of 1420 may be performed by a modulation manager as described with reference to FIGS. 9 through 12.

Figure 15:
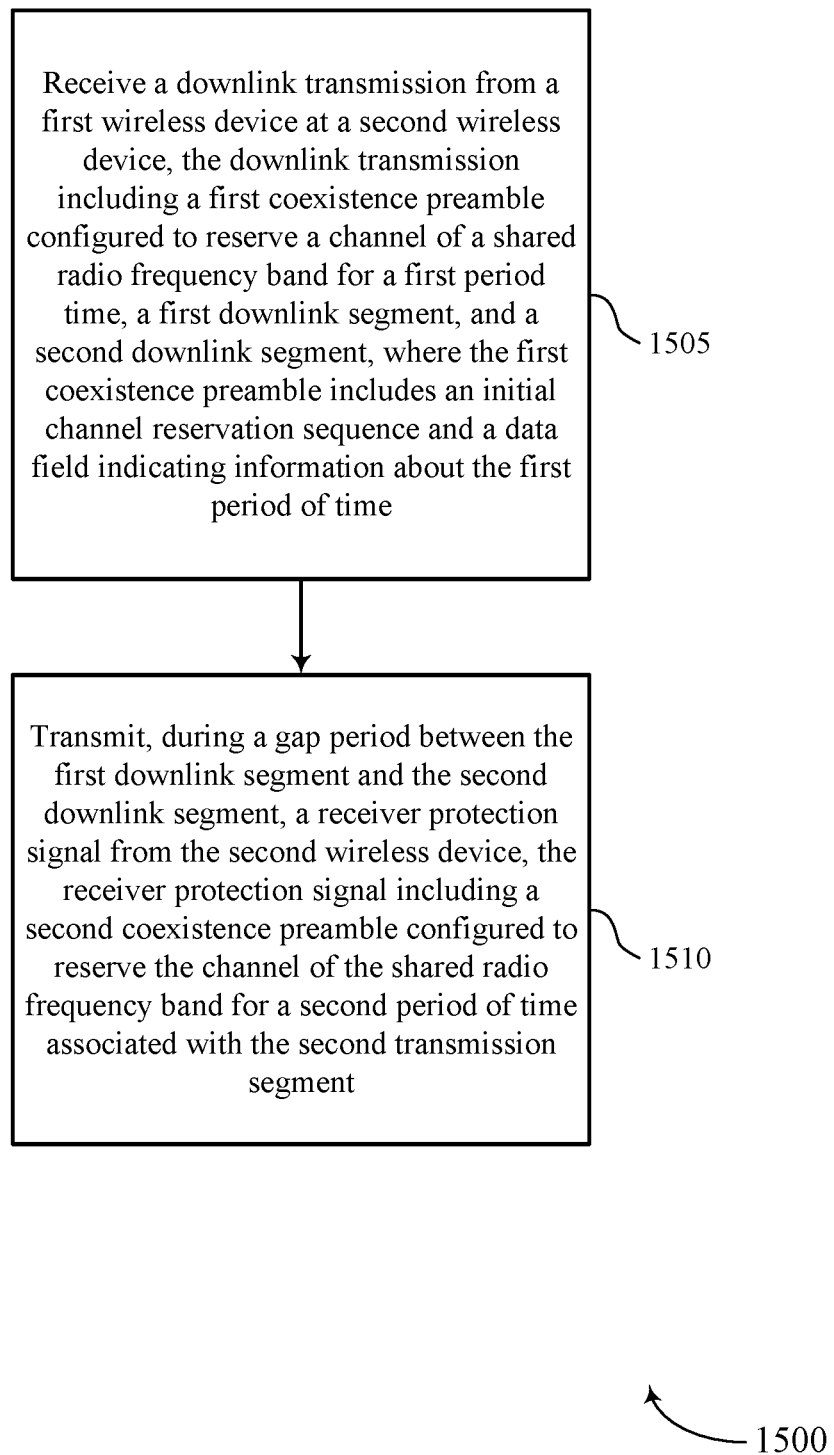

FIG. 15 shows a flowchart illustrating a method 1500 that supports intertechnology medium sharing for millimeter wave in accordance with aspects of the present disclosure. The operations of method 1500 may be implemented by a device or its components as described herein. For example, the operations of method 1500 may be performed by a coexistence manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1505, the device may receive a transmission (e.g., a downlink transmission or uplink transmission) from a first wireless device at a second wireless device, the transmission including a first coexistence preamble configured to reserve a channel of a shared radio frequency band for a first period of time, a first segment (e.g., a first downlink segment), and a second segment (e.g., a second downlink segment), where the first coexistence preamble includes an initial channel reservation sequence and a data field indicating information about the first period of time. The operations of 1505 may be performed according to the methods described herein. In some examples, aspects of the operations of 1505 may be performed by a downlink manager as described with reference to FIGS. 9 through 12.

At 1510, the device may transmit, during a gap period between the first segment and the second segment, a receiver protection signal from the second wireless device, the receiver protection signal including a second coexistence preamble configured to reserve the channel of the shared radio frequency band for a second period of time associated with the second transmission segment. The operations of 1510 may be performed according to the methods described herein. In some examples, aspects of the operations of 1510 may be performed by a reservation manager as described with reference to FIGS. 9 through 12.

Figure 16:
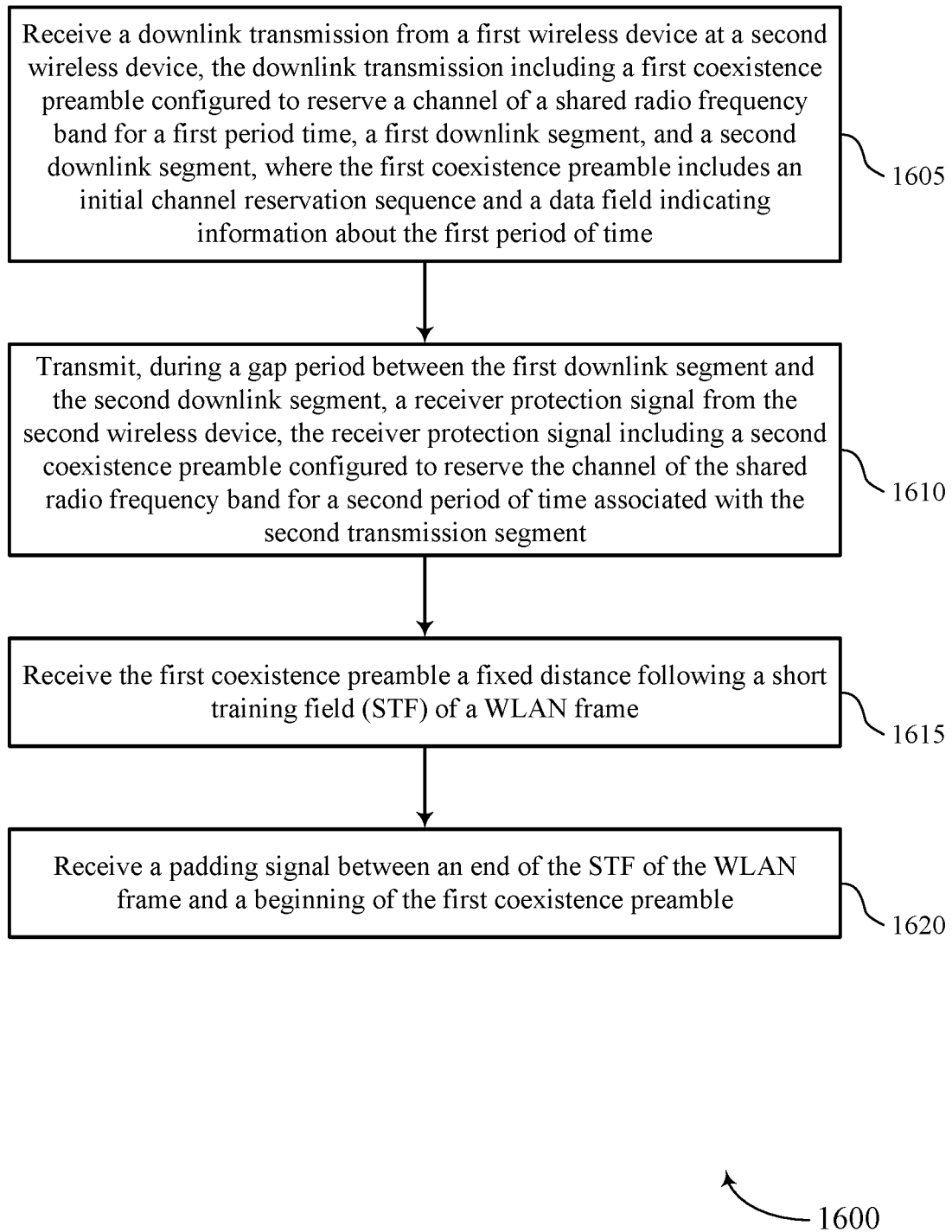

FIG. 16 shows a flowchart illustrating a method 1600 that supports intertechnology medium sharing for millimeter wave in accordance with aspects of the present disclosure. The operations of method 1600 may be implemented by a device or its components as described herein. For example, the operations of method 1600 may be performed by a coexistence manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1605, the device may receive a transmission (e.g., a downlink transmission or uplink transmission) from a first wireless device at a second wireless device, the transmission including a first coexistence preamble configured to reserve a channel of a shared radio frequency band for a first period of time, a first segment (e.g., a first downlink segment), and a second segment (e.g., a second downlink segment), where the first coexistence preamble includes an initial channel reservation sequence and a data field indicating information about the first period of time. The operations of 1605 may be performed according to the methods described herein. In some examples, aspects of the operations of 1605 may be performed by a downlink manager as described with reference to FIGS. 9 through 12.

At 1610, the device may transmit, during a gap period between the first segment and the second segment, a receiver protection signal from the second wireless device, the receiver protection signal including a second coexistence preamble configured to reserve the channel of the shared radio frequency band for a second period of time associated with the second transmission segment. The operations of 1610 may be performed according to the methods described herein. In some examples, aspects of the operations of 1610 may be performed by a reservation manager as described with reference to FIGS. 9 through 12.

At 1615, the device may receive the first coexistence preamble a fixed distance following a short training field (STF) of a WLAN frame. The operations of 1615 may be performed according to the methods described herein. In some examples, aspects of the operations of 1615 may be performed by a reservation manager as described with reference to FIGS. 9 through 12.

At 1620, the device may receive a padding signal between an end of the STF of the WLAN frame and a beginning of the first coexistence preamble. The operations of 1620 may be performed according to the methods described herein. In some examples, aspects of the operations of 1620 may be performed by a reservation manager as described with reference to FIGS. 9 through 12.

Figure 17:
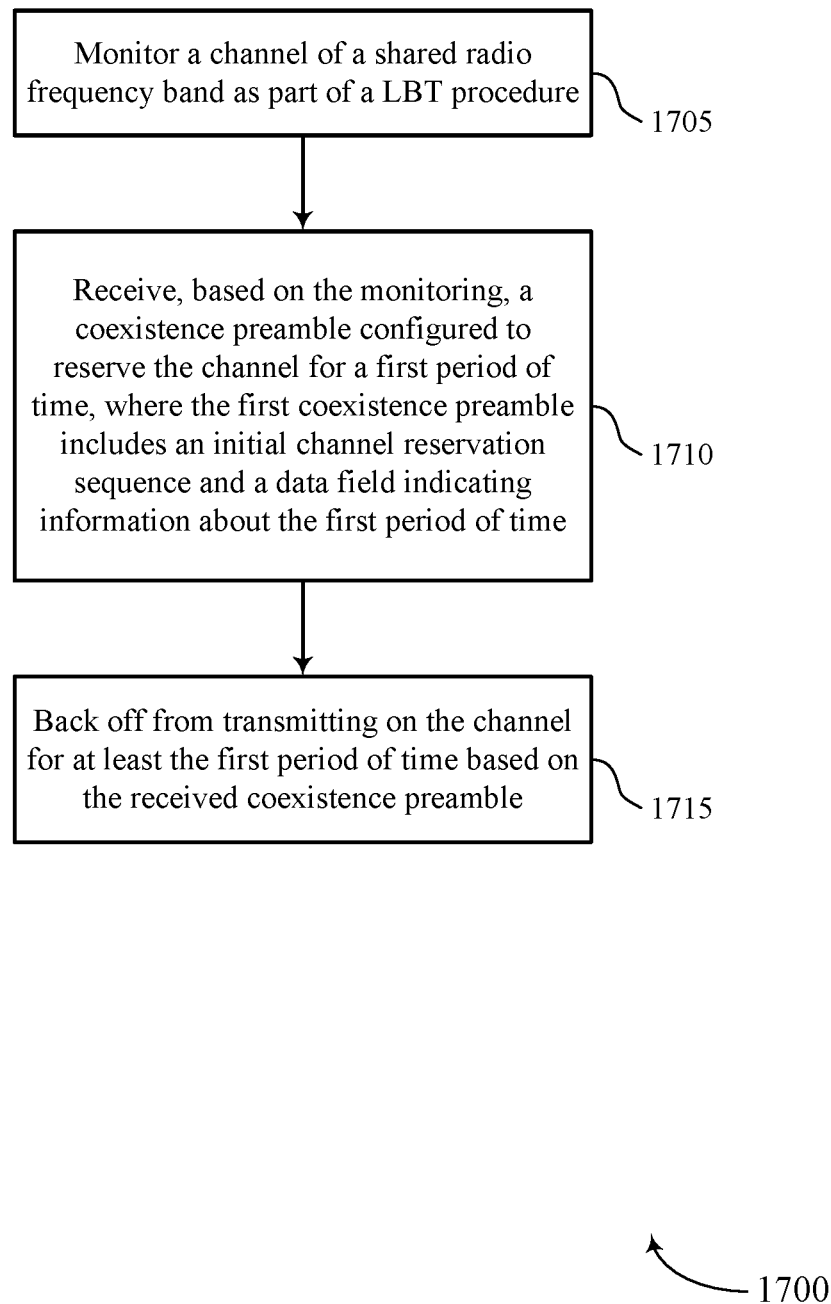

FIG. 17 shows a flowchart illustrating a method 1700 that supports intertechnology medium sharing for millimeter wave in accordance with aspects of the present disclosure. The operations of method 1700 may be implemented by a device or its components as described herein. For example, the operations of method 1700 may be performed by a coexistence manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1705, the device may monitor a channel of a shared radio frequency band as part of a channel sensing procedure (e.g., LBT procedure). The operations of 1705 may be performed according to the methods described herein. In some examples, aspects of the operations of 1705 may be performed by a control manager as described with reference to FIGS. 9 through 12.

At 1710, the device may receive, based on the monitoring, a coexistence preamble configured to reserve the channel for a first period of time, where the first coexistence preamble includes an initial channel reservation sequence and a data field indicating information about the first period of time. The operations of 1710 may be performed according to the methods described herein. In some examples, aspects of the operations of 1710 may be performed by a downlink manager as described with reference to FIGS. 9 through 12.

At 1715, the device may back off from transmitting on the channel for at least the first period of time based on the received coexistence preamble. The operations of 1715 may be performed according to the methods described herein. In some examples, aspects of the operations of 1715 may be performed by a reservation manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a transmission from a first wireless device at a second wireless device, the transmission comprising a first coexistence preamble configured to reserve a channel of a shared radio frequency band for a first period of time, a first segment, and a second segment, wherein the first coexistence preamble comprises an initial channel reservation sequence and a data field indicating information about the first period of time; and
   transmitting, during a gap period between the first segment and the second segment, a receiver protection signal from the second wireless device, the receiver protection signal comprising a second coexistence preamble configured to reserve the channel of the shared radio frequency band for a second period of time associated with the second transmission segment.

2. The method of claim 1, further comprising:
   transmitting in connection with the receiver protection signal one or more of: an acknowledgment message from the second wireless device for the first segment, a negative acknowledgment message from the second wireless device for the first segment, or a control channel transmission from the second wireless device.

3. The method of claim 1, wherein transmitting the receiver protection signal comprises transmitting a plurality of receiver protection signals during a plurality of gap periods between segments of the first period of time.

4. The method of claim 1, further comprising:
   demodulating a phase of a Golay sequence to obtain the information about the first period of time.

5. The method of claim 1, wherein the information about the first period of time comprises one or more of: a duration of the first period of time, a signal strength offset associated with the first period of time, a length of the first segment or the second segment, an interfering signal strength offset associated with the first period of time.

6. The method of claim 1, wherein the first coexistence preamble further comprises a request for omnidirectional medium sensing.

7. The method of claim 1, wherein the first coexistence preamble is prepended to a short training field (STF) of a wireless local area network (WLAN) frame.

8. The method of claim 1, wherein a short training field (STF) of a wireless local area network (WLAN) frame is punctured with the first coexistence preamble.

9. The method of claim 1, wherein the first coexistence preamble comprises a short training field (STF) of a wireless local area network (WLAN) frame.

10. The method of claim 1, further comprising:
    receiving the first coexistence preamble a fixed distance following a short training field (STF) of a wireless local area network (WLAN) frame.

11. The method of claim 10, further comprising:
    receiving a padding signal between an end of the STF of the WLAN frame and a beginning of the first coexistence preamble.

12. The method of claim 1, wherein the initial channel reservation sequence comprises a Golay sequence.

13. The method of claim 1, wherein the second period of time is based at least in part on a minimum dwell time associated with the channel.

14. The method of claim 1, wherein the first coexistence preamble and the second coexistence preamble are detectable by both cellular devices and wireless local area network (WLAN) devices.

15. The method of claim 1, wherein receiving the transmission comprises:
    receiving a plurality of coexistence preambles during the first period of time.

16. An apparatus for wireless communication, comprising: a processor, memory in electronic communication with the processor; and instructions stored in the memory and executable by the processor to cause the apparatus to:
    receive a transmission from a wireless device at the apparatus, the transmission comprising a first coexistence preamble configured to reserve a channel of a shared radio frequency band for a first period of time, a first segment, and a second segment, wherein the first coexistence preamble comprises an initial channel reservation sequence and a data field indicating information about the first period of time; and
    transmit, during a gap period between the first segment and the second segment, a receiver protection signal from the apparatus, the receiver protection signal comprising a second coexistence preamble configured to reserve the channel of the shared radio frequency band for a second period of time associated with the second transmission segment.

17. The apparatus of claim 16, wherein the instructions are further executable by the processor to cause the apparatus to:
    transmit in connection with the receiver protection signal one or more of: an acknowledgment message from the apparatus for the first segment, a negative acknowledgment message from the apparatus for the first segment, or a control channel transmission from the apparatus.

18. The apparatus of claim 16, wherein transmitting the receiver protection signal comprises transmitting a plurality of receiver protection signals during a plurality of gap periods between segments of the first period of time.

19. The apparatus of claim 16, wherein the instructions are further executable by the processor to cause the apparatus to:
    demodulate a phase of a Golay sequence to obtain the information about the first period of time.

20. The apparatus of claim 16, wherein the information about the first period of time comprises one or more of: a duration of the first period of time, a signal strength offset associated with the first period of time, a length of the first segment or the second segment, an interfering signal strength offset associated with the first period of time.

21. The apparatus of claim 16, wherein the first coexistence preamble further comprises a request for omnidirectional medium sensing.

22. The apparatus of claim 16, wherein the first coexistence preamble is prepended to a short training field (STF) of a wireless local area network (WLAN) frame.

23. The apparatus of claim 16, wherein a short training field (STF) of a wireless local area network (WLAN) frame is punctured with the first coexistence preamble.

24. The apparatus of claim 16, wherein the first coexistence preamble comprises a short training field (STF) of a wireless local area network (WLAN) frame.

25. The apparatus of claim 16, wherein the instructions are further executable by the processor to cause the apparatus to:

receive the first coexistence preamble a fixed distance following a short training field (STF) of a wireless local area network (WLAN) frame.

\* \* \* \* \*